US012679540B2

(12) United States Patent
Talluri et al.

(10) Patent No.: US 12,679,540 B2
(45) Date of Patent: Jul. 14, 2026

(54) SEAT MULTI INFORMATION DISPLAY SYSTEM

(71) Applicant: B/E Aerospace, Inc., Winston-Salem, NC (US)

(72) Inventors: Rajesh Talluri, Hyderabad (IN); Lakshmana Kumar Marineni, Hyderabad (IN); Manikanta Kummari, Hyderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 140 days.

(21) Appl. No.: 18/742,809

(22) Filed: Jun. 13, 2024

(65) Prior Publication Data

US 2025/0340298 A1 Nov. 6, 2025

(30) Foreign Application Priority Data

May 1, 2024 (IN) .............................. 202411034664

(51) Int. Cl.
*B64D 11/00* (2006.01)
*B64D 11/06* (2006.01)
*G06F 3/14* (2006.01)

(52) U.S. Cl.
CPC ........ *B64D 11/00155* (2014.12); *B64D 11/06* (2013.01); *G06F 3/1423* (2013.01)

(58) Field of Classification Search
CPC .......................... B60N 2210/24; B60N 2/0025; B60N 2/0026; B60N 2210/42; B60N 2230/20; B60N 2/0022; B60N 2/0027; B60N 2/0029; B60N 2210/12; B60N 2220/20; G09F 9/33; G09F 3/00; G09F 7/00
See application file for complete search history.

(56) References Cited

U.S. PATENT DOCUMENTS

| | | | | |
|---|---|---|---|---|
| 4,958,853 | A * | 9/1990 | Doty | G09F 7/00 297/472 |
| 6,177,887 | B1 * | 1/2001 | Jerome | B64D 11/0638 379/49 |
| 6,578,795 | B2 | 6/2003 | Romca et al. | |
| 6,964,481 | B2 | 11/2005 | Pho et al. | |
| 7,722,192 | B2 | 5/2010 | Huonker | |
| 7,880,636 | B2 | 2/2011 | Heym | |
| 8,789,954 | B1 | 7/2014 | Atkins et al. | |
| 9,092,136 | B1 * | 7/2015 | Patel | G06F 3/04886 |

(Continued)

FOREIGN PATENT DOCUMENTS

| | | |
|---|---|---|
| DE | 102008008153 B4 | 8/2009 |
| GB | 2423619 B | 8/2006 |

(Continued)

*Primary Examiner* — Shin H Kim

(74) *Attorney, Agent, or Firm* — Suiter Swantz IP

(57) ABSTRACT

A seat group may include passenger seats with holographic displays. The holographic displays may display icons. The seat group may include a seat-group controller which causes the holographic displays to display the icons. The icons may include seat identifier icons which may be displayed while the passenger seats are unoccupied to provide passengers with visual cues which seats may be available. The icons may include fasten-seatbelt icons which may be displayed while seatbelts are not fastened to provide flight attendants with visual cues which passengers need to fasten the seatbelts.

14 Claims, 22 Drawing Sheets

(56)                    References Cited

U.S. PATENT DOCUMENTS

| | | | |
|---|---|---|---|
| 10,214,287 | B2 | 2/2019 | Valentine, Jr. |
| 10,237,511 | B2 | 3/2019 | Garing et al. |
| 10,640,216 | B2 | 5/2020 | Salazar et al. |
| 10,996,481 | B1* | 5/2021 | Wells ............... B32B 17/10449 |
| 11,142,335 | B2 | 10/2021 | Lauer |
| 11,262,646 | B2 | 3/2022 | McIntosh |
| 11,492,121 | B2 | 11/2022 | Sawada et al. |
| 11,738,870 | B2 | 8/2023 | Shetgar et al. |
| 2005/0080533 | A1* | 4/2005 | Basir ....................... B60R 22/48 |
| | | | 701/45 |
| 2008/0106702 | A1 | 5/2008 | Huonker |
| 2009/0112638 | A1* | 4/2009 | Kneller ................. G06Q 10/00 |
| | | | 705/5 |
| 2010/0245092 | A1* | 9/2010 | Albert ................... A61G 7/018 |
| | | | 340/573.7 |

| | | | |
|---|---|---|---|
| 2016/0048725 | A1* | 2/2016 | Holz ..................... H04N 7/181 |
| | | | 345/156 |
| 2017/0283065 | A1 | 10/2017 | Papke et al. |
| 2021/0070448 | A1 | 3/2021 | Nguyen et al. |
| 2021/0157135 | A1* | 5/2021 | Wells ..................... B60K 35/60 |
| 2021/0331685 | A1* | 10/2021 | Cabello ................ B60N 2/0022 |
| 2022/0097649 | A1* | 3/2022 | Bok ..................... B60R 16/027 |
| 2022/0153429 | A1 | 5/2022 | Foster |
| 2022/0212802 | A1* | 7/2022 | Pawliczek .............. G06Q 10/20 |
| 2022/0382135 | A1 | 12/2022 | McIntosh |
| 2023/0014553 | A1* | 1/2023 | Homma ................. G01C 21/36 |

FOREIGN PATENT DOCUMENTS

| | | | |
|---|---|---|---|
| WO | 2005076248 | A1 | 8/2005 |
| WO | 2006002852 | A2 | 1/2006 |
| WO | 2020263529 | A1 | 12/2020 |

* cited by examiner

<u>200</u>

<u>210</u>
Cause holographic displays of passenger seats to display seat-identifier icons

↓

<u>220</u>
Receive occupied signals from occupancy sensors of occupied passenger seats and unoccupied signals from occupancy sensors of unoccupied passenger seats

↓

<u>230</u>
Stop the holographic displays of the occupied passenger seats from displaying the seat-identifier icons in response to receiving the occupied signal

↓

<u>240</u>
Assign the occupied passenger seats as assigned passenger seats and the unoccupied passenger seats as unassigned seats in response to receiving an all-seated signal

↓

<u>250</u>
Stop the holographic displays of the unassigned passenger seats from displaying the seat-identifier icons

↓

<u>260</u>
Receive unoccupied signals from occupancy sensors of the assigned passenger seats

↓

<u>270</u>
Cause holographic displays of assigned passenger seats from which the unoccupied signals are received to display the seat-identifier icons while receiving the unoccupied signals

Figure 4:
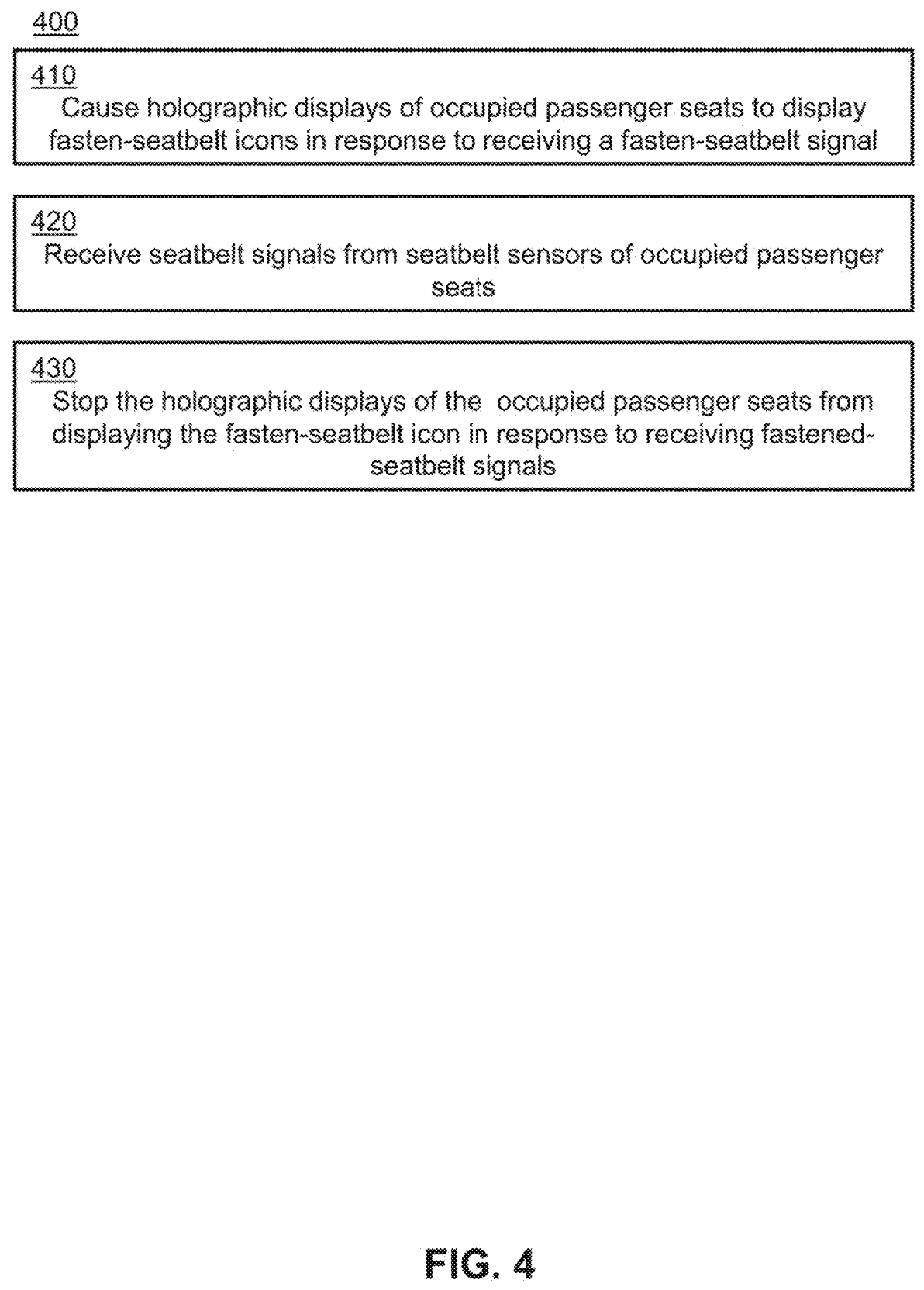

410
    Cause holographic displays of occupied passenger seats to display fasten-seatbelt icons in response to receiving a fasten-seatbelt signal

---

420
    Receive seatbelt signals from seatbelt sensors of occupied passenger seats

---

430
    Stop the holographic displays of the  occupied passenger seats from displaying the fasten-seatbelt icon in response to receiving fastened-seatbelt signals

SEAT MULTI INFORMATION DISPLAY SYSTEM

CROSS REFERENCE TO RELATED APPLICATIONS

The present application claims the benefit of India Provisional Patent Application 202411034664, filed May 1, 2024, titled "SEAT MULTI INFORMATION DISPLAY SYSTEM", with a DAS code of 5AB3, which is incorporated herein by reference in the entirety.

TECHNICAL FIELD

The present disclosure generally relates to aircraft indicators, and more specifically to indicators in the cabin.

BACKGROUND

Passengers with assigned seat numbers may spend time to comparing the assigned seat numbers with a seat map during boarding. The passengers may prevent subsequent passengers in-line from boarding during the duration spent comparing the assigned seat numbers with the seat map. Therefore, it would be advantageous to provide a device, system, and method that cures the shortcomings described above.

SUMMARY

In some aspects, the techniques described herein relate to a seat group, including: a plurality of passenger seats including: a plurality of seatbacks; a plurality of seat pans; a plurality of holographic displays, wherein the plurality of holographic displays are disposed above the plurality of seatbacks, wherein the plurality of holographic displays are configured to display a plurality of icons; and a plurality of seat belts; and a seat-group controller configured to cause the plurality of holographic displays to display the plurality of icons.

In some aspects, the techniques described herein relate to a seat group, wherein the plurality of passenger seats are in a three-abreast configuration.

In some aspects, the techniques described herein relate to a seat group, wherein the plurality of holographic displays are coupled to a top of the plurality of seatbacks.

In some aspects, the techniques described herein relate to a seat group, wherein the plurality of holographic displays are transparent, wherein the plurality of icons illuminate forwards and rearwards from the plurality of holographic displays.

In some aspects, the techniques described herein relate to a seat group, wherein the plurality of holographic displays include a trapezoid shape.

In some aspects, the techniques described herein relate to a seat group, wherein the plurality of icons include a plurality of seat-identifier icons, wherein the plurality of seat-identifier icons include seat numbers and seat letters, wherein the seat-group controller is configured to cause the plurality of holographic displays to display the plurality of seat-identifier icons.

In some aspects, the techniques described herein relate to a seat group, wherein the plurality of passenger seats include a plurality of occupancy sensors, wherein the plurality of occupancy sensors are configured to generate a plurality of occupancy signals; wherein the seat-group controller is configured to receive the plurality of occupancy signals, wherein the plurality of occupancy signals include occupied signals of occupied passenger seats of the plurality of passenger seats and unoccupied signals of unoccupied passenger seats of the plurality of passenger seats; wherein the seat-group controller is configured to stop the plurality of holographic displays of the occupied passenger seats from displaying the plurality of seat-identifier icons in response to receiving the occupied signals.

In some aspects, the techniques described herein relate to a seat group, wherein the seat-group controller is configured to assign the occupied passenger seats as assigned passenger seats and the unoccupied passenger seats as unassigned passenger seats; wherein the seat-group controller is configured to stop the plurality of holographic displays of the unassigned passenger seats from displaying the plurality of seat-identifier icons; and wherein the seat-group controller is configured to receive the unoccupied signals from the plurality of occupancy sensors of the assigned passenger seats; wherein the seat-group controller is configured to cause the plurality of holographic displays of the assigned passenger seats from which the unoccupied signals are received to display the plurality of seat-identifier icons while receiving the unoccupied signals.

In some aspects, the techniques described herein relate to a seat group, wherein the plurality of icons include a plurality of fasten-seatbelt icons, wherein the seat-group controller is configured to cause the plurality of holographic displays to display the plurality of fasten-seatbelt icons in response to receiving a fasten-seatbelt signal.

In some aspects, the techniques described herein relate to a seat group, wherein the plurality of passenger seats include occupied passenger seats, wherein the seat-group controller is configured to cause the plurality of holographic displays of the occupied passenger seats to display the plurality of fasten-seatbelt icons in response to receiving the fasten-seatbelt signal.

In some aspects, the techniques described herein relate to a seat group, wherein the plurality of passenger seats include a plurality of seatbelt sensors, wherein the plurality of seatbelt sensors are configured to generate a plurality of seatbelt signals, wherein the plurality of seatbelt signals include a plurality of fastened-seatbelt signals and a plurality of unfastened-seatbelt signals, wherein the seat-group controller is configured to receive the plurality of seatbelt signals from the plurality of seatbelt sensors; wherein the seat-group controller is configured to stop the plurality of holographic displays of the occupied passenger seats from displaying the plurality of fasten-seatbelt icons in response to receiving the plurality of fastened-seatbelt signals.

In some aspects, the techniques described herein relate to a seat group, wherein the plurality of passenger seats include a plurality of seatback displays, wherein the plurality of seatback displays are configured to generate a plurality of seatback display signals, wherein the seat-group controller is configured to receive the plurality of seatback display signals.

In some aspects, the techniques described herein relate to a seat group, wherein at least one of: wherein the plurality of seatback display signals include a plurality of call-attendant signals, wherein the plurality of icons include a plurality of call-attendant icons; or wherein the plurality of seatback display signals include a plurality of drink-request signals, wherein the plurality of icons include a plurality of drink-request icons; or wherein the plurality of seatback display signals include a plurality of food-request signals, wherein the plurality of icons include a plurality of food-request icons.

In some aspects, the techniques described herein relate to an aircraft including: a plurality of seat groups including: a plurality of passenger seats including: a plurality of seat-backs; a plurality of seat pans; a plurality of holographic displays, wherein the plurality of holographic displays are disposed above the plurality of seatbacks, wherein the plurality of holographic displays are configured to display a plurality of icons; and a plurality of seat belts; and a plurality of seat-group controllers configured to cause the plurality of holographic displays to display the plurality of icons.

In some aspects, the techniques described herein relate to an aircraft, wherein the plurality of seat-group controllers are configured to receive a plurality of all-seated signals and a plurality of fasten-seatbelt signals from the flight-attendant controller.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 2 depicts a flow diagram of a method, in accordance with one or more embodiments of the present disclosure.

FIG. 4 depicts a flow diagram of a method, in accordance with one or more embodiments of the present disclosure.

DETAILED DESCRIPTION

Figure 1A:
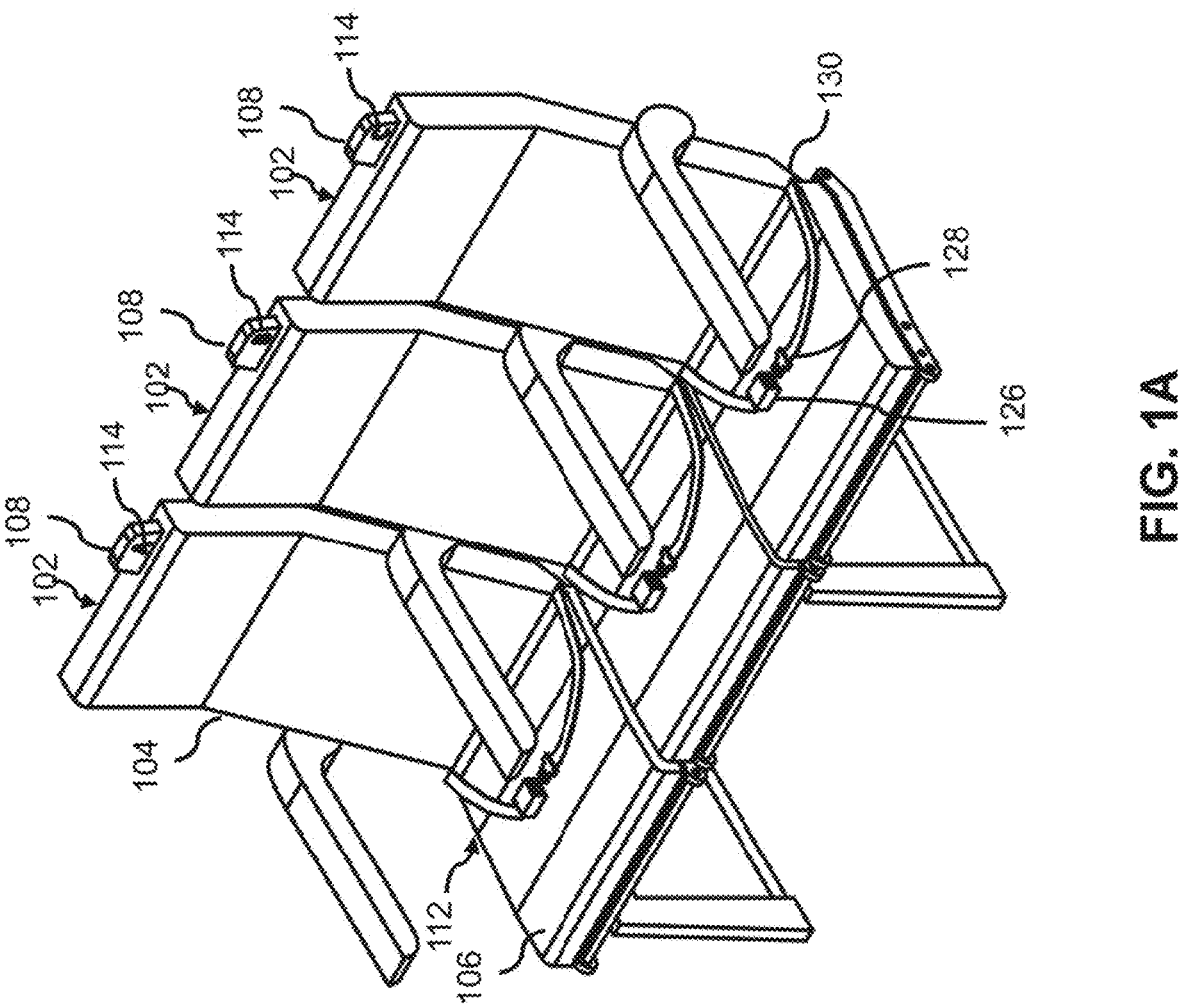
FIG. 1A depicts a front perspective view of a seat group, in accordance with one or more embodiments of the present disclosure.
Figure 1B:
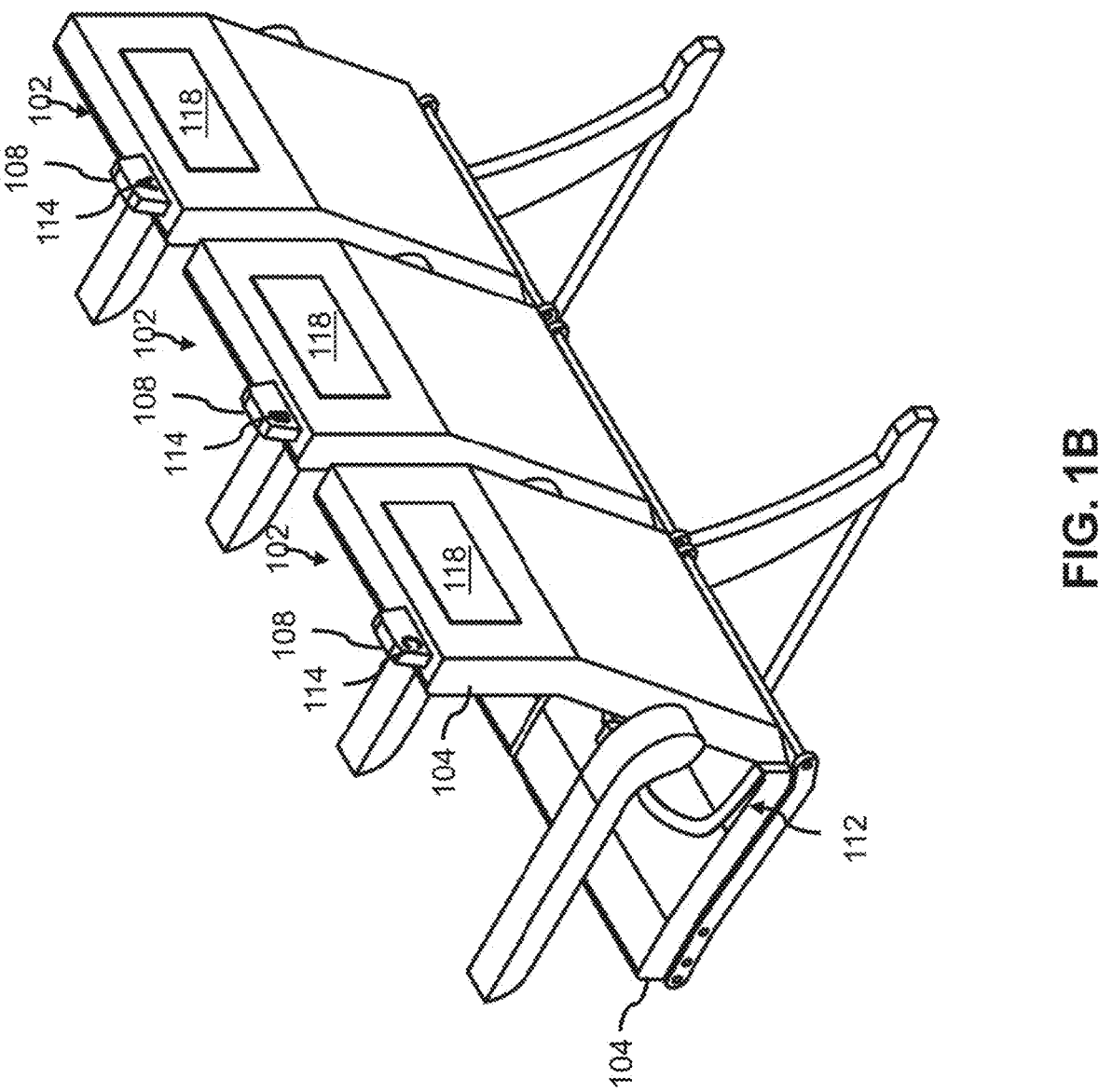
FIG. 1B depicts a rear perspective view of the seat group, in accordance with one or more embodiments of the present disclosure.
Figure 1C:
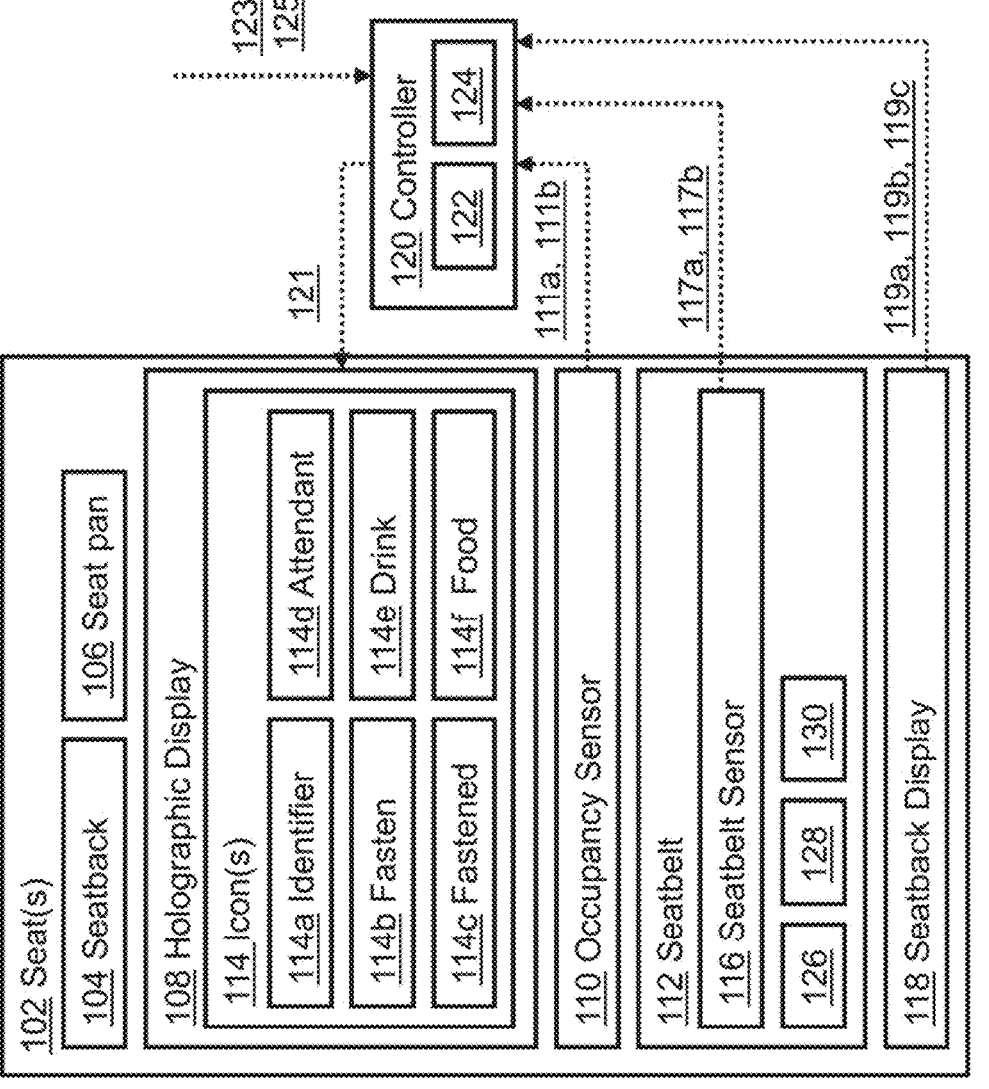
FIG. 1C depicts a simplified block diagram of the seat group, in accordance with one or more embodiments of the present disclosure.
Figure 1D:
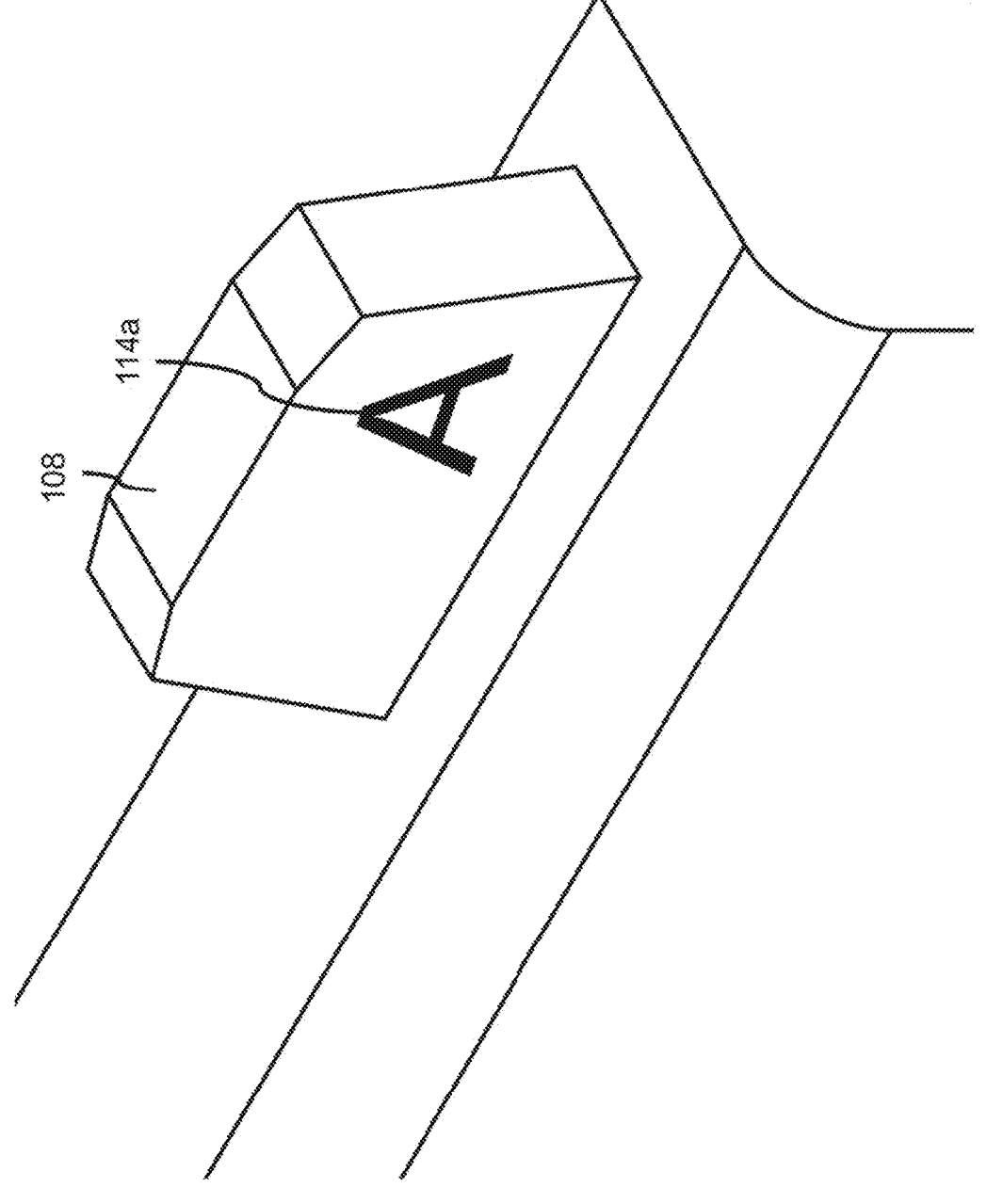
FIG. 1D depicts a holographic display of the seat group displaying a seat-identifier icon, in accordance with one or more embodiments of the present disclosure.
Figure 1E:
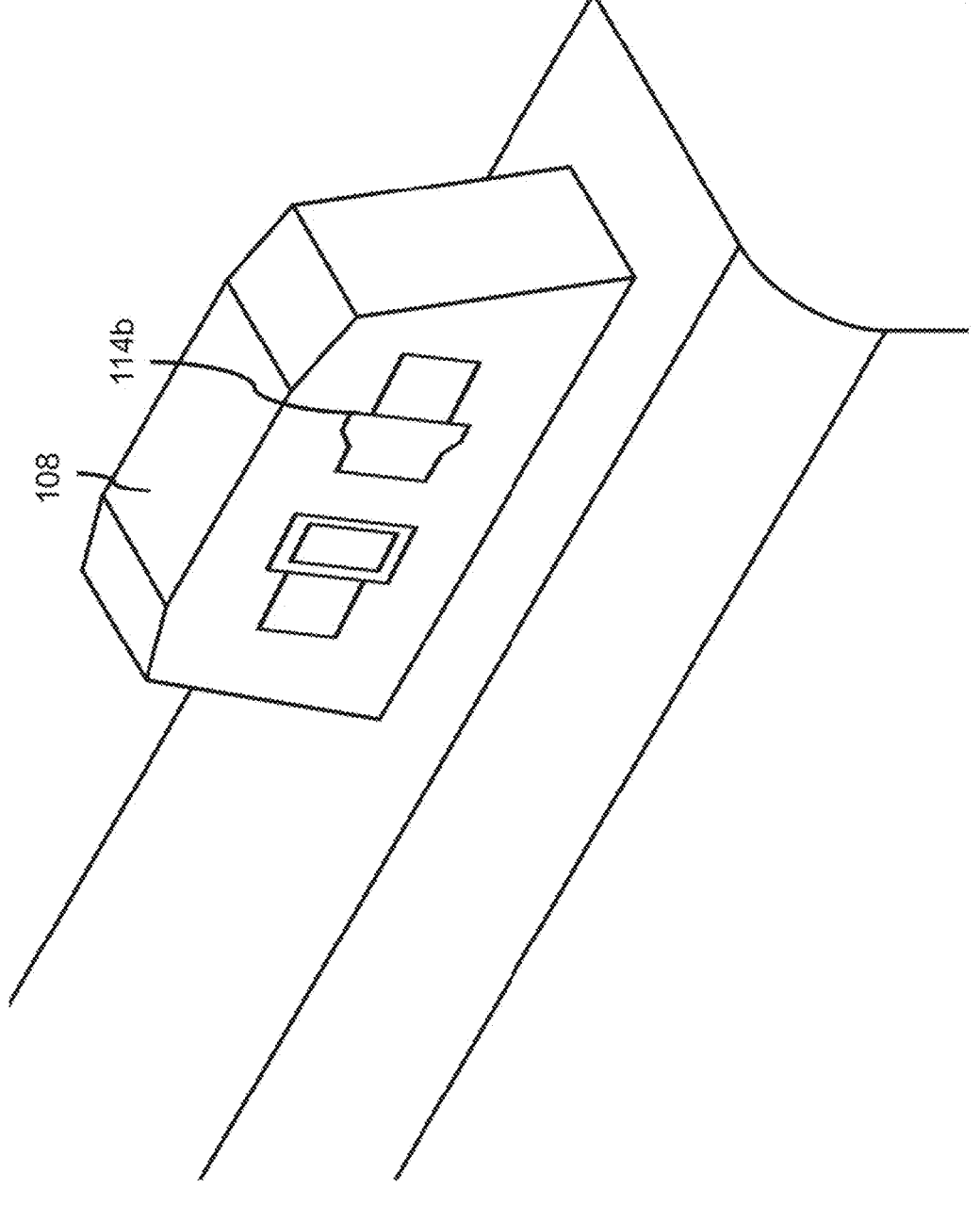
FIG. 1E depicts the holographic display of the seat group displaying a fasten-seatbelt icon, in accordance with one or more embodiments of the present disclosure.
Figure 1F:
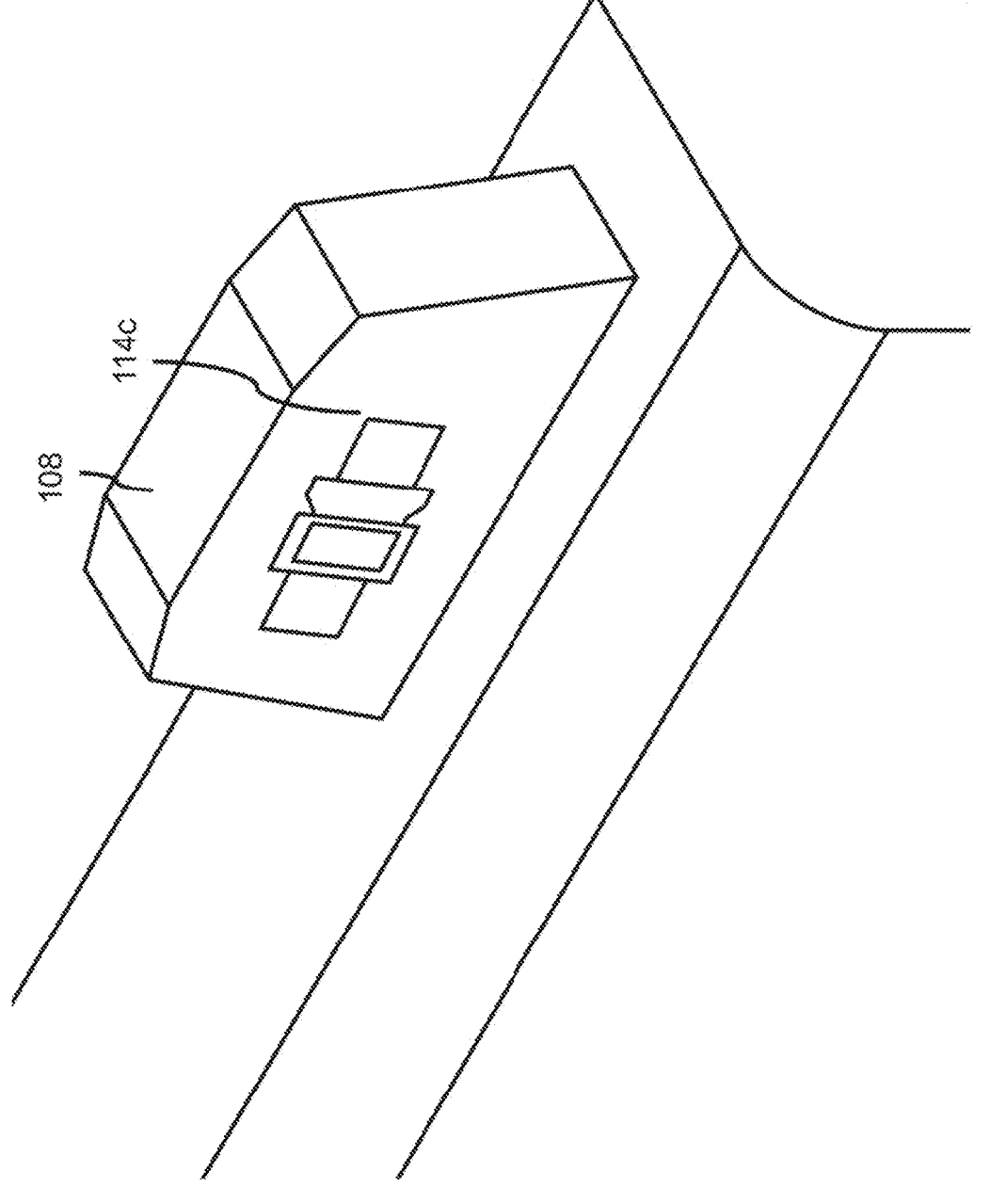
FIG. 1F depicts the holographic display of the seat group displaying a fastened-seatbelt icon, in accordance with one or more embodiments of the present disclosure.
Figure 1G:
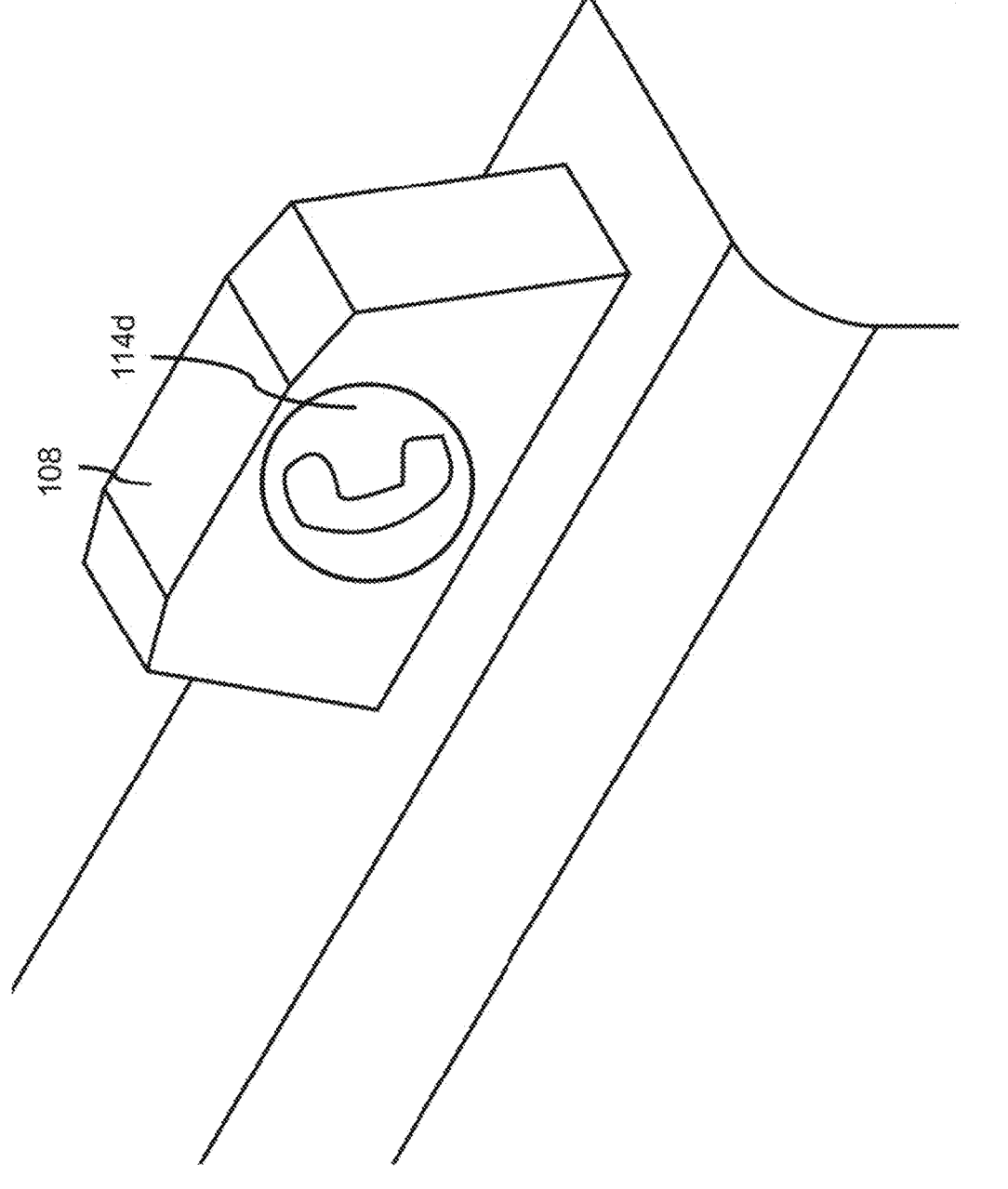
FIG. 1G depicts the holographic display of the seat group displaying a call-attendant icon, in accordance with one or more embodiments of the present disclosure.
Figure 1H:
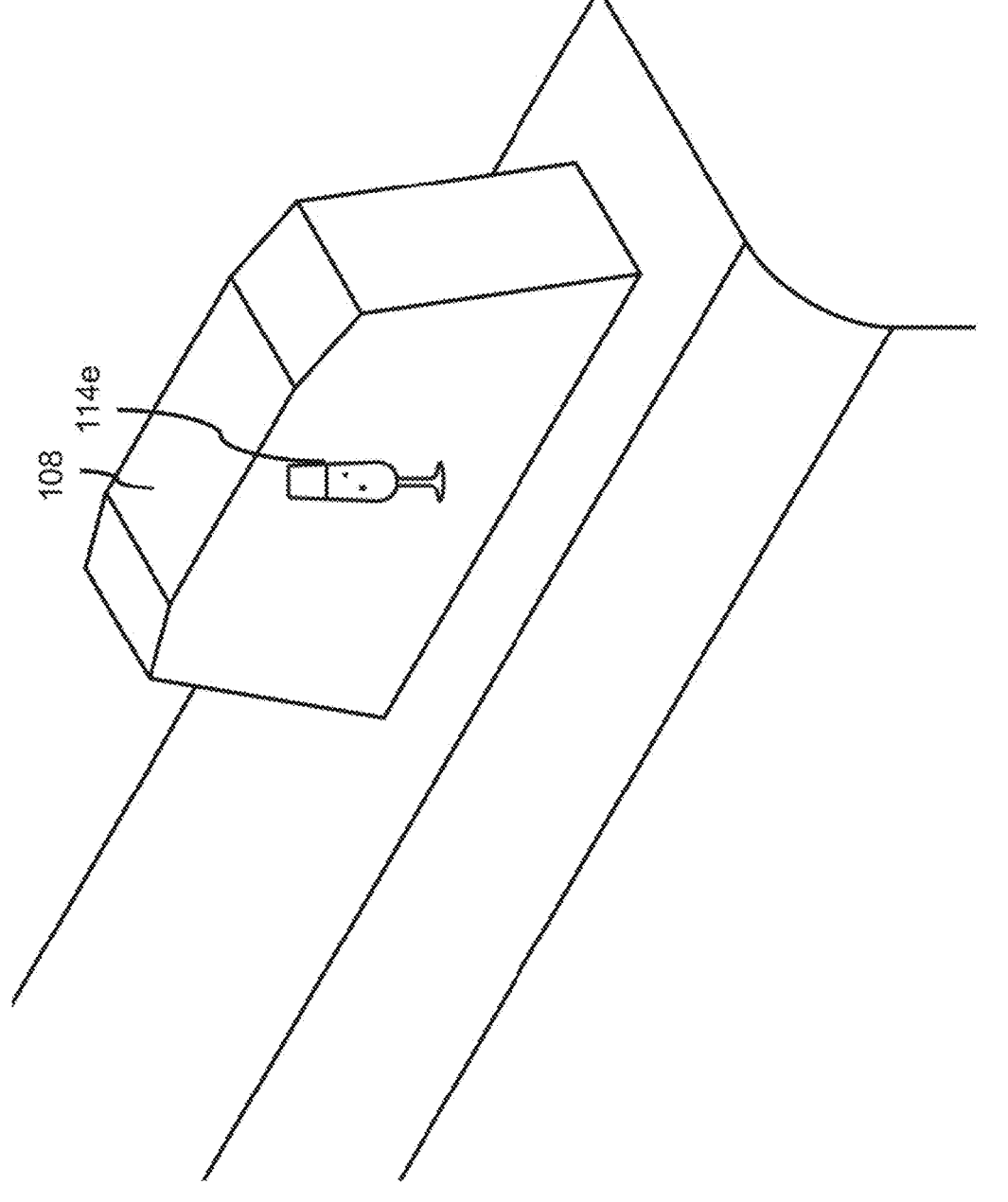
FIG. 1H depicts the holographic display of the seat group displaying a drink-request icon, in accordance with one or more embodiments of the present disclosure.
Figure 1I:
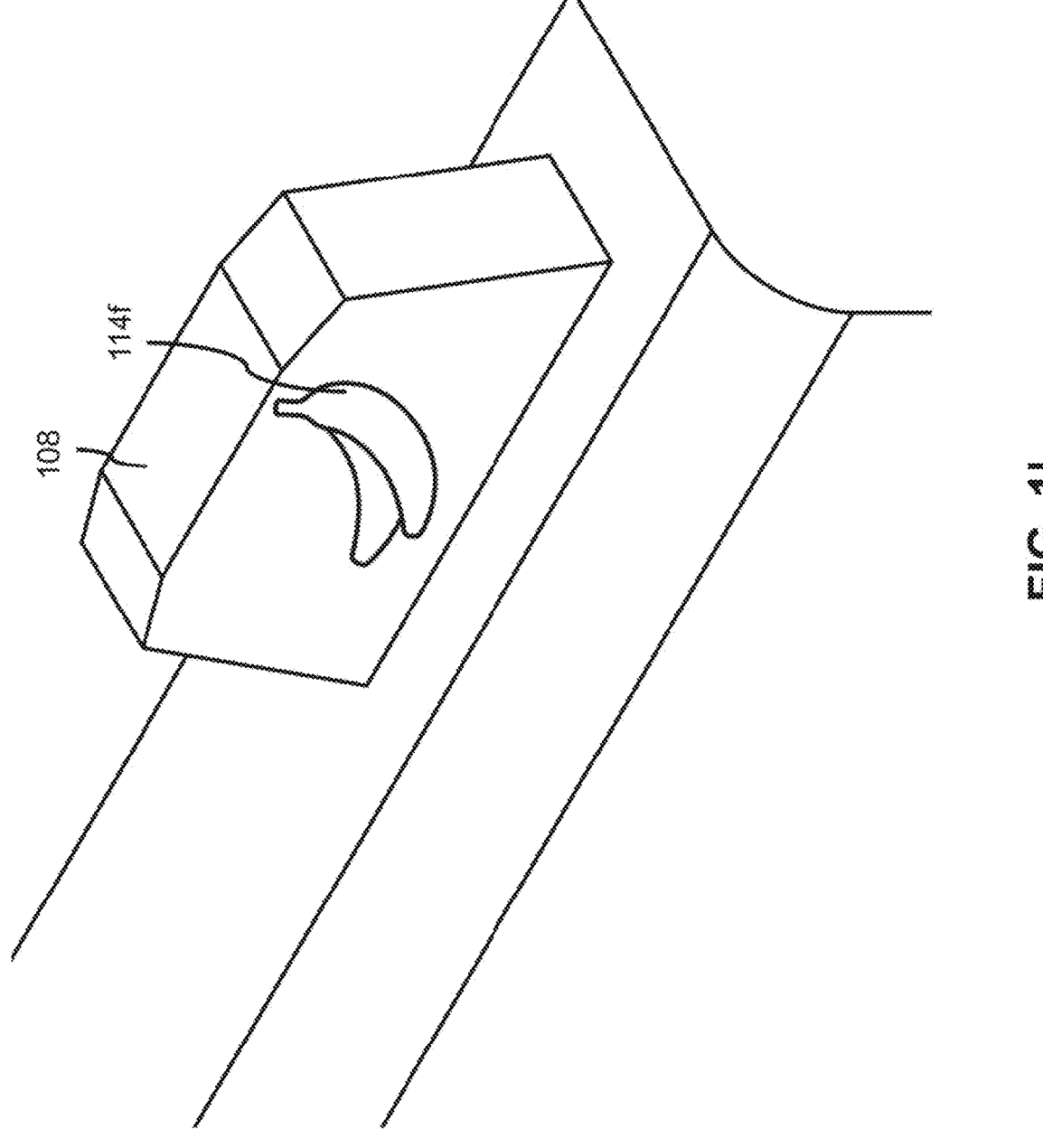
FIG. 1I depicts the holographic display of the seat group displaying a food-request icon, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are directed to a seat multi-information display system. The seat multi-information display system may be embodied in a seat group. The seat group may include passenger seats with holographic displays. The holographic displays may display icons. The seat group may include a seat-group controller which causes the holographic displays to display the icons. The icons may include seat identifier icons which may be displayed while the passenger seats are unoccupied to provide passengers with visual cues which seats may be available. The icons may include fasten-seatbelt icons which may be displayed while seatbelts are not fastened to provide flight attendants with visual cues which passengers need to fasten the seatbelts.

U.S. Pat. No. 11,492,121B2, titled "Aircraft projection device"; U.S. Pat. No. 7,880,636B2, titled "Information display system for aircraft"; U.S. Pat. No. 6,578,795B2, titled "Passenger orientation arrangement in a passenger cabin"; U.S. Patent Publication Number US20170283065A1, titled "Aircraft Interior Surface and Method of Illuminating an Aircraft Interior Surface"; U.S. Pat. No. 7,722,192B2, titled "Integrated projector included in a seat for displaying information"; U.S. Pat. No. 10,237,511B2, titled "Projection information display"; U.S. Patent Publication Number US20220382135A1, titled "Personal projection system for travel environments and methods of operating thereof"; U.S. Pat. No. 6,964,481B2, titled "Apparatus and method for projecting identifying information onto seats"; U.S. Patent Publication Number US20080106702A1, titled "Integrated projector included in a seat for displaying information"; are incorporated herein by reference in the entirety.

FIGS. 1A-1I depict a seat group 100, in accordance with one or more embodiments of the present disclosure. The seat group 100 may include passenger seats 102, a seat-group controller 120, and the like. The seat group 100 may include between one and four of the passenger seats 102. For example, the seat group 100 is depicted as including three of the passenger seats 102, in a three-abreast configuration. Although the seat group 100 is depicted as a three-abreast configuration, the concepts, techniques, features, and technologies described herein can be extended to any seat group configuration, such as a one-abreast, two-abreast, three-abreast, four-abreast, and the like.

The passenger seats 102 may include, but is not limited to, an economy-class passenger seat. The passenger seats 102 include one or more components, such as, but not limited to, seatbacks 104, seat pans 106, holographic displays 108, occupancy sensors 110, seatbelts 112, seatback displays 118, and the like.

The seatbacks 104 may be coupled to the seat pans 106. The seatbacks 104 may be configured to pivot relative to the seat pans 106. For example, the seatbacks 104 can be configured to transition between upright and reclining positions by pivoting relative to the seat pans 106. The seatbacks 104 may be coupled to the seat pans 106 by one or more revolute joints, or the like.

The holographic displays 108 may use holography using optical waves. The optical waves may include electromagnetic radiations within the range of visible light. The holographic displays 108 may include any apparatus for holography using optical waves, such as, but not limited to, laser plasma holographic displays, micromagnetic piston holographic displays, touchable holographic displays, electro-holographic displays, parallax holographic displays, volumetric holographic displays, and the like.

The holographic displays 108 may be disposed above the seatbacks 104. The holographic displays 108 may be coupled to a top of the seatbacks 104. The holographic displays 108 may be coupled to a topmost surface of seatbacks 104. The holographic displays 108 may be integrated with the head rests of the seatbacks 104. For example, the holographic displays 108 may be coupled to a top surface of a headrest of the seatbacks 104.

The holographic displays 108 may include a shape. For example, the holographic displays 108 may include a trapezoid shape, a pyramid shape, or the like. A shape of the holographic displays 108 may provide a surface from which to display the icons 114. A size and shape may change based on a design of the seat group 100.

The holographic displays 108 may be transparent. Transparent may mean having at most 50% opacity. The term transparent therefore includes both transparent materials and translucent materials. The holographic displays 108 may include between 0 and 50% opacity.

The holographic displays 108 may include a material. For example, the holographic displays 108 may include a material, such as, but not limited to, glass, plastic, crystal, acrylic, polycarbonate, polystyrene, cellulose, ceramic, lacquer, urethane, epoxy, resin, and combinations thereof.

The holographic displays 108 may be configured to display icons 114. The icons 114 may also be referred to as images, holograms, aircraft indicators, or the like.

The icons 114 may be monochromatic or polychromatic. The icons 114 may include one or more colors in the visible spectrum.

The holographic displays 108 may be a two-dimensional holographic display or a three-dimensional holographic display. The icons 114 may be two-dimensional icons or three-dimensional icons.

The icons 114 may be displayed through the holographic displays 108. The icons 114 may illuminate forwards and rearwards from the holographic displays 108. The holographic displays 108 may be visible from forward and aft positions. The forward and aft positions may refer to positions in front of (e.g., in which an occupant may sit on the seat pans 106) and behind, respectively, the seat group 100. The holographic displays 108 may be visible from forward and aft positions by being disposed above the seatbacks 104. The icons 114 displayed by the holographic displays 108 may be visible from forward and aft directions of the seat group 100. The view of the icons 114 from the aft position may be a mirror-image of the view of the icons 114 from the forward position.

The icons 114 may include one or more shapes which represent different icons. The icons 114 may include indicators or signs in the cabin. For example, the icons 114 may include seat-identifier icons 114a, fasten-seatbelt icons 114b, fastened-seatbelt icons 114c, call-attendant icons 114d, drink-request icons 114e, food-request icons 114f, exit signs, or the like.

The seat-identifier icons 114a may include seat numbers and/or seat letters. For example, the seat numbers and/or seat letters may be used in combination to denote rows and columns of the passenger seats 102. A style, shape, color, and/or size of the seat-identifier icons 114a can be varied as per the airliner requirement. The seat-identifier icons 114a may aid determining the seat-identifier associated with the seat-identifier icons 114a (e.g., aid passengers during boarding). By displaying the seat-identifier icons 114a, passengers may occupy the passenger seats 102 more rapidly. A boarding time may be reduced by enabling the passengers to determine the seat-identifier. The seat-identifier icons 114a may guide the passengers to the passenger seats 102 providing a better passenger experience. The passengers may identify the seat-identifier icons 114a by boarding from the forward and/or the aft direction.

The fasten-seatbelt icons 114b may include an icon indicating to fasten the seatbelts 112. For example, the fasten-seatbelt icons 114b may include a depiction of the buckle 126, the tongue 128, and/or the belts 130. The fasten-seatbelt icons 114b may include an arrow pointing between the depiction of the buckle 126 and the tongue 128.

The fastened-seatbelt icons 114c may include an icon indicating the seatbelts 112 is fastened. For example, the fastened-seatbelt icons 114c may include a depiction of the buckle 126 which is fastened to the tongue 128. The fastened-seatbelt icons 114c may include a different color than the fasten-seatbelt icons 114b.

The call-attendant icons 114d may be an icon indicating to call a flight attendant.

The drink-request icons 114e may be an icon indicating to request a drink.

The food-request icons 114f may be an icon indicating to request food.

The occupancy sensors 110 may include a load sensing device, or the like. The occupancy sensors 110 may detect whether the passenger seats 102 are occupied passenger seats or unoccupied passenger seats. The occupancy sensors 110 may detect the occupant sitting on the passenger seats 102 such that the passenger seats 102 are occupied passenger seats. The occupancy sensors 110 may detect no occupant sitting on the passenger seats 102 such that the passenger seats 102 are unoccupied passenger seats. The occupancy sensors 110 may detect the occupant via a load sensing device. The occupancy sensors 110 may be disposed within the seatbacks 104, the seat pans 106, or the like.

The occupancy sensors 110 may be configured to generate occupancy signals 111. The occupancy signals 111 may include occupied signals 111a and/or unoccupied signals 111b. The occupied signals 111a and unoccupied signals 111b may indicate the passenger seats 102 are occupied and unoccupied, respectively. The occupancy sensors 110 may be configured to generate the occupied signals 111a and unoccupied signals 111b based on a load sensed by the occupancy sensors 110. Occupied may refer to a load on the passenger seats 102 (e.g., passengers sitting on the passenger seats 102). Unoccupied may refer to no load on the passenger seats 102 (e.g., no passengers sitting on the passenger seats 102).

The seatbelts 112 may be lap belts. The seatbelts 112 may include seatbelt sensors 116, buckles 126, tongues 128, belts 130, and the like. The buckles 126 may be configured to attach to and detach from the tongues 128 by which the seatbelts 112 may be fastened and unfastened, respectively. The belts 130 may couple from the buckles 126 and tongues 128 to the seatbacks 104, the seat pans 106, a frame, or the like. The seatbelt sensors 116 may be coupled to the buckles 126, the tongues 128, or the like of the seatbelt sensors 116.

The seatbelt sensors 116 may be configured to generate seatbelt signals 117. The seatbelt signals 117 may include fastened-seatbelt signals 117a and/or unfastened-seatbelt signals 117b. The fastened-seatbelt signals 117a and/or unfastened-seatbelt signals 117b may indicate the seatbelts 112 are fastened and unfastened, respectively. The seatbelt sensors 116 may be configured to generate the fastened-seatbelt signals 117a and/or unfastened-seatbelt signals 117b based on a signal sensed by the seatbelt sensors 116. Fastened may refer to the buckle 126 is attached to the tongue 128. Unfastened may refer to the buckle 126 is detached from the tongue 128. The seatbelt fastened signals and/or seatbelt unfastened signals may also be referred to as buckled and unbuckled, respectively.

The seatback displays 118 may be coupled to the seatback 104. For example, the seatback displays 118 may be coupled to an aft surface of the seatback 104. The aft surface of the seatback 104 may be disposed opposite to the surface on which the back of the passenger may be supported by the seatback 104. The seatback displays 118 may be an in-flight entertainment unit. The seatback displays 118 may be configured to display one or more images and/or videos during flight.

The seatback displays 118 may be configured to generate seatback display signals 119. The seatback display signals 119 may include, but are not limited to, a call-attendant signals 119a, a drink-request signals 119b, a food-request signals 119c, and the like. The seatback displays 118 may include a screen that displays a graphical user interface ("GUI"). The seatback displays 118 may include a touch-screen with soft-keys and/or a screen with hard-keys adjacent to the screen. The seatback displays 118 may generate the seatback display signals 119 via the soft-keys and/or the hard-keys. Soft-keys may refer to a reprogrammable key which is displayed on the touchscreen. A hard-key may refer to a physical key.

The seat-group controller 120 may be an electronic control unit (ECU) or the like. The seat-group controller 120 may include processors 122 and memory 124.

The processors 122 may include any processor or processing element. For the purposes of the present disclosure, the term "processor" or "processing element" may be broadly defined to encompass any device having one or more processing or logic elements (e.g., one or more microprocessor devices, one or more application-specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in memory). Moreover, different subsystems of the system may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers.

The memory 124 may include any memory medium suitable for storing program instructions executable by the associated one or more processors. For example, the memory medium may include a non-transitory memory medium. By way of another example, the memory medium may include, but is not limited to, a read-only memory (ROM), a random-access memory (RAM), a magnetic or optical memory device (e.g., disk), a magnetic tape, a solid-state drive and the like. It is further noted that memory medium may be housed in a common controller housing with the one or more processors.

The seat-group controller 120 may cause the holographic displays 108 to display the icons 114. The seat-group controller 120 may control which of the icons 114 to which the holographic displays 108 may display. The seat-group controller 120 may cause the holographic displays 108 to switch between one or more of the icons 114. The seat-group controller 120 may change the icons 114 based on the usage. For example, the seat-group controller 120 may include control logic for selectively displaying the icons 114.

The seat-group controller 120 may supply power to one or more components of the seat group 100. For example, the seat-group controller 120 may supply power to the holographic displays 108, the occupancy sensors 110, the seatbelt sensors 116, the seatback displays 118, and the like. The seat-group controller 120 may supply power to holographic displays 108 through a headrest of the seatbacks 104. The holographic displays 108 may share power with the seatback displays 118.

The seat-group controller 120 may be configured to receive one or more signals, such as, but not limited to, the occupancy signals 111 (e.g., the occupied signals 111*a* and/or unoccupied signals 111*b*), the seatbelt signals 117 (e.g., the fastened-seatbelt signals 117*a*, unfastened-seatbelt signals 117*b*), the seatback display signals 119 (e.g., the call-attendant signals 119*a*, the drink-request signals 119*b*, the food-request signals 119*c*), all-seated signals 123, fasten-seatbelt signals 125, and the like. The seat-group controller 120 may receive the occupancy signals 111 from the occupancy sensors 110. The seat-group controller 120 may receive the seatbelt signals 117 from the seatbelt sensors 116. The seat-group controller 120 may receive the seatback display signals 119 from the seatback displays 118. The seat-group controller 120 may receive the all-seated signals 123 and/or the fasten-seatbelt signals 125 from one or more external sources to the seat group 100, such as, but not limited to, a flight attendant controller.

The seat-group controller 120 may control the holographic displays 108 based on the one or more signals. For example, the seat-group controller 120 may control the holographic displays 108 based on the occupancy signals 111, the seatbelt signals 117, the seatback display signals 119, all-seated signals 123, fasten-seatbelt signals 125, and the like.

The seat-group controller 120 may generate control signals 121. The control signals 121 may cause the holographic displays 108 to display the icons 114. For example, the seat-group controller 120 may cause the holographic displays 108 to display the seat-identifier icons 114*a* in response to receiving the By way of another example, the seat-group controller 120 may cause the holographic displays 108 to display the call-attendant icons 114*d*, the drink-request icons 114*e*, and/or the food-request icons 114*f* in response to receiving the call-attendant signals 119*a*, the drink-request signals 119*b*, and the food-request signals 119*c*, respectively.

The seat-group controller 120 may include control logic for generating the control signals 121. For example, the seat-group controller 120 may perform one or more steps of the method 200 for displaying the seat-identifier icons 114*a*. By way of another example, the seat-group controller 120 may perform one or more steps of the method 200 for displaying the fasten-seatbelt icons 114*b*.

FIG. 2 depicts a flow diagram of a method 200, in accordance with one or more embodiments of the present disclosure. The method may also be referred to as a method of controlling the icons 114 of the holographic displays 108 during boarding and in-flight. The embodiments and the enabling technologies described previously herein in the context of the holographic displays 108 should be interpreted to extend to the method. It is further noted, however, that the method is not limited to the architecture of the holographic displays 108.

In a step 210, the seat-group controller 120 may cause the holographic displays 108 of the passenger seats 102 to display the seat-identifier icons 114*a*. For example, the seat-group controller 120 may cause the holographic displays 108 of the passenger seats 102 to display the seat-identifier icons 114*a* via the control signals 121.

In a step 220, the seat-group controller 120 may receive the occupancy signals 111. The seat-group controller 120 may receive the occupancy signals 111 from the passenger seats 102. For example, the seat-group controller 120 may receive the occupancy signals 111 from the occupancy sensors 110 of the passenger seats 102. The occupancy signals 111 may include the occupied signals 111*a* of occupied passenger seats and unoccupied signals 111*b* from unoccupied passenger seats, of the passenger seats 102. The occupied signals 111*a* may be received from the occupancy sensors 110 of the occupied passenger seats and unoccupied signals 111*b* from the occupancy sensors 110 of the unoccupied passenger seats. Thus, the occupancy sensors 110 may indicate which of the passenger seats 102 are occupied and which are unoccupied.

In a step 230, the seat-group controller 120 may stop the holographic displays 108 of the occupied passenger seats from displaying the seat-identifier icons 114*a* in response to receiving the occupied signals 111*a*. Thus, the holographic displays 108 may display the seat-identifier icons 114*a* for the unoccupied passenger seats and not display the seat-identifier icons 114*a* for the occupied passenger seats. The seat-identifier icons 114*a* may be displayed while unoccupied and not displayed while occupied. Displaying the seat-identifier icons 114*a* while unoccupied and not displaying while occupied may allow the passenger to visually distinguish unoccupied passenger seats from the occupied passenger seats via the seat-identifier icons 114*a*.

In a step 240, the seat-group controller 120 may assign the occupied passenger seats as assigned passenger seats and the unoccupied passenger seats as unassigned seats in response to receiving the all-seated signal 123. For example, the seat-group controller 120 may know which of the passenger seats 102 are the occupied passenger seats and which are the unoccupied passenger seats based on the occupancy signals 111 (e.g., based on the occupied signals 111*a* and the unoccupied signals 111*b*). The seat-group controller 120 may maintain the assigned passenger seats and the unassigned seats in the memory 124.

In a step 250, the seat-group controller 120 stop the holographic displays of the unassigned passenger seats from displaying the seat-identifier icons 114*a*. Stopping the holographic displays of the unassigned passenger seats from displaying the seat-identifier icons 114*a* may enable flight attendants to generate the all-seated icons thereby causing the seat-group controller 120 to switch of the seat-identifier icons 114*a* for the unassigned passenger seats.

In a step 260, the seat-group controller 120 may receive the unoccupied signals 111*b* from the occupancy sensors 110 of the assigned passenger seats. The unoccupied signals 111*b* may be received after assigning the occupied passenger seats as the assigned passenger seats. For example, the unoccupied signals 111*b* may be received during flight after reaching a cruise altitude at which passengers may leave the passenger seats 102.

In a step 270, the seat-group controller 120 may cause the holographic displays 108 of the assigned passenger seats from which the unoccupied signals 111*b* are received to display the seat-identifier icons 114*a* while receiving the unoccupied signals 111*b*. In this regard, the seat-identifier icons 114*a* may provide a visual cue to which passenger seat the passenger is supposed to return. The seat-group controller 120 may stop the holographic displays 108 of the assigned passenger seats from display the seat-identifier icons 114*a* when the occupied signals 111*a* are received.

Figure 3A:
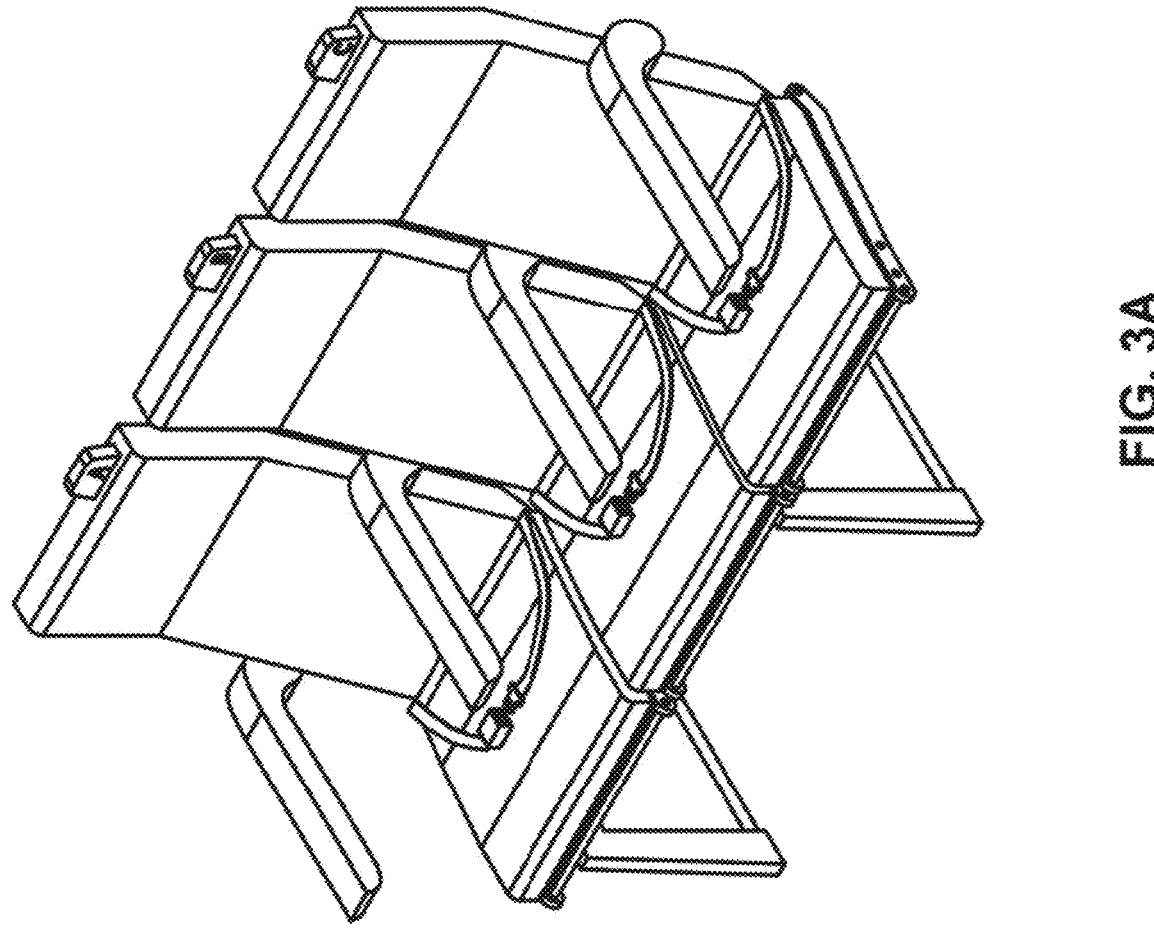
FIGS. 3A-3F depict one or more steps of the method, in accordance with one or more embodiments of the present disclosure.
Figure 3B:
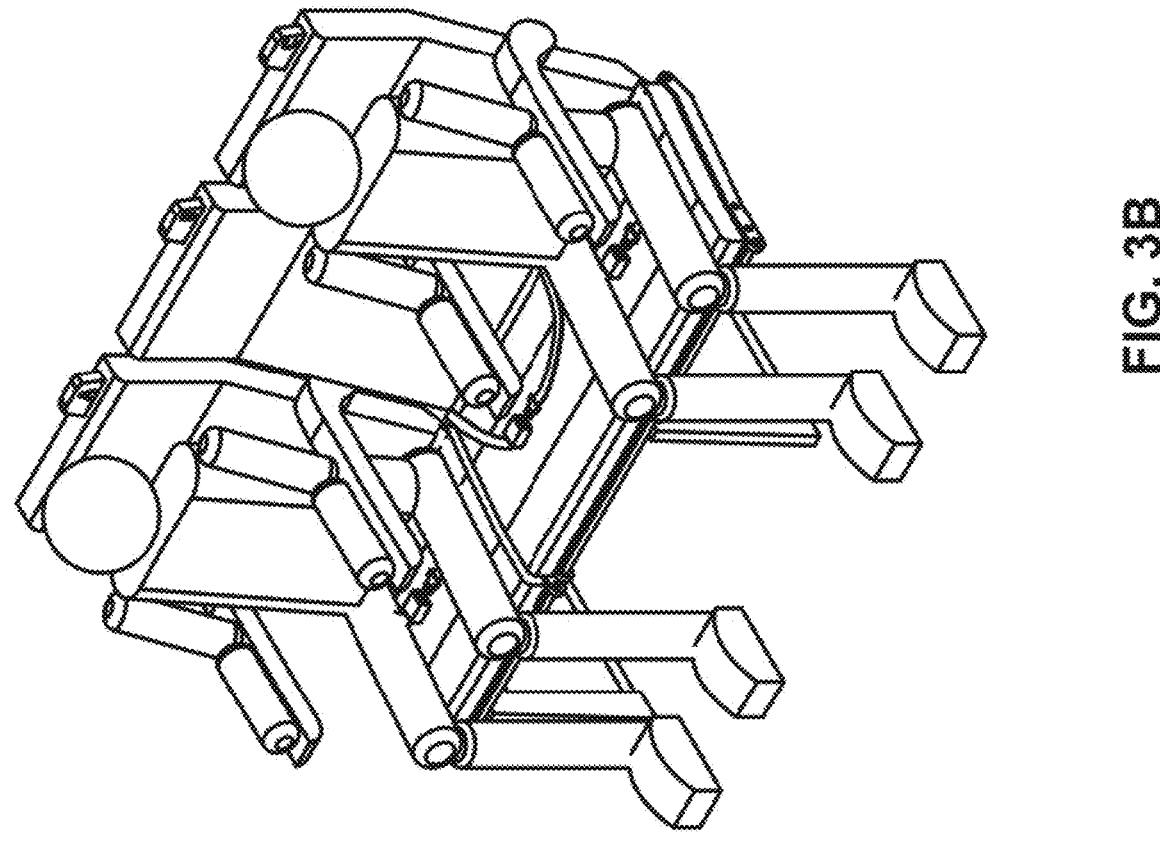
Figure 3C:
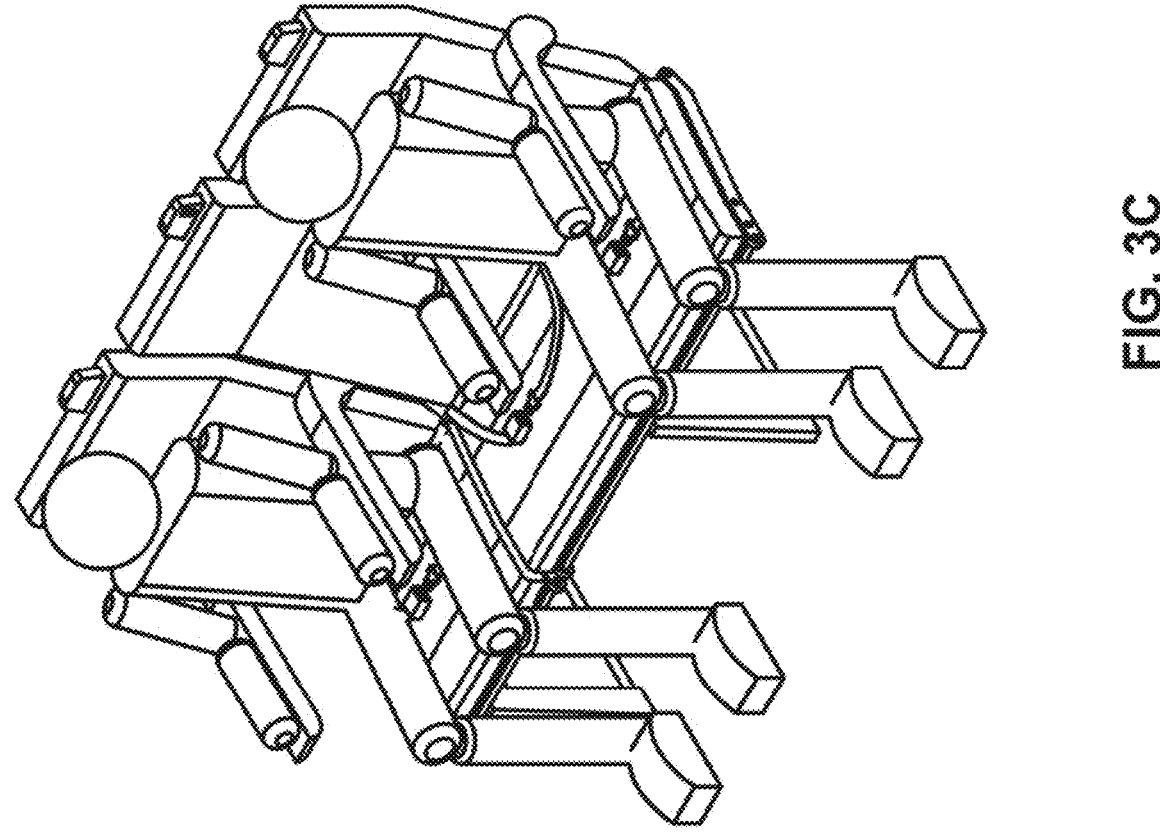
Figure 3D:
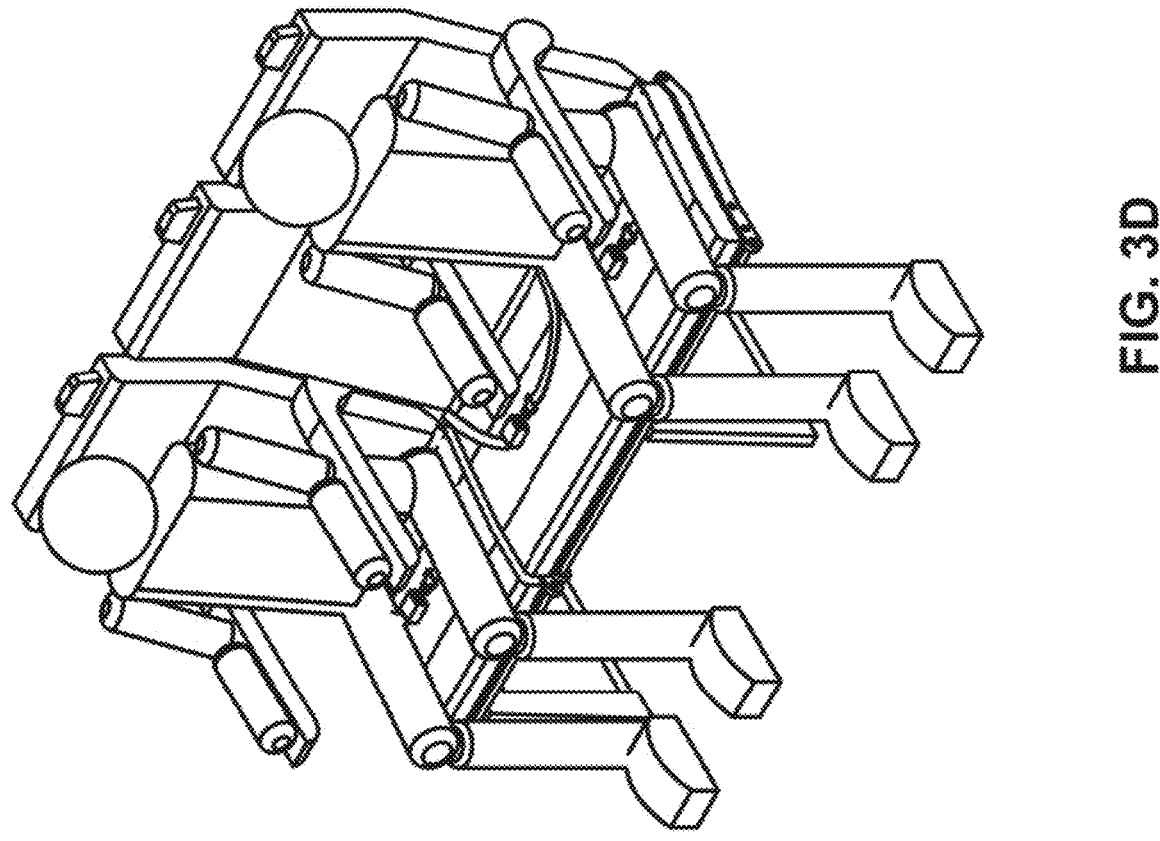
Figure 3E:
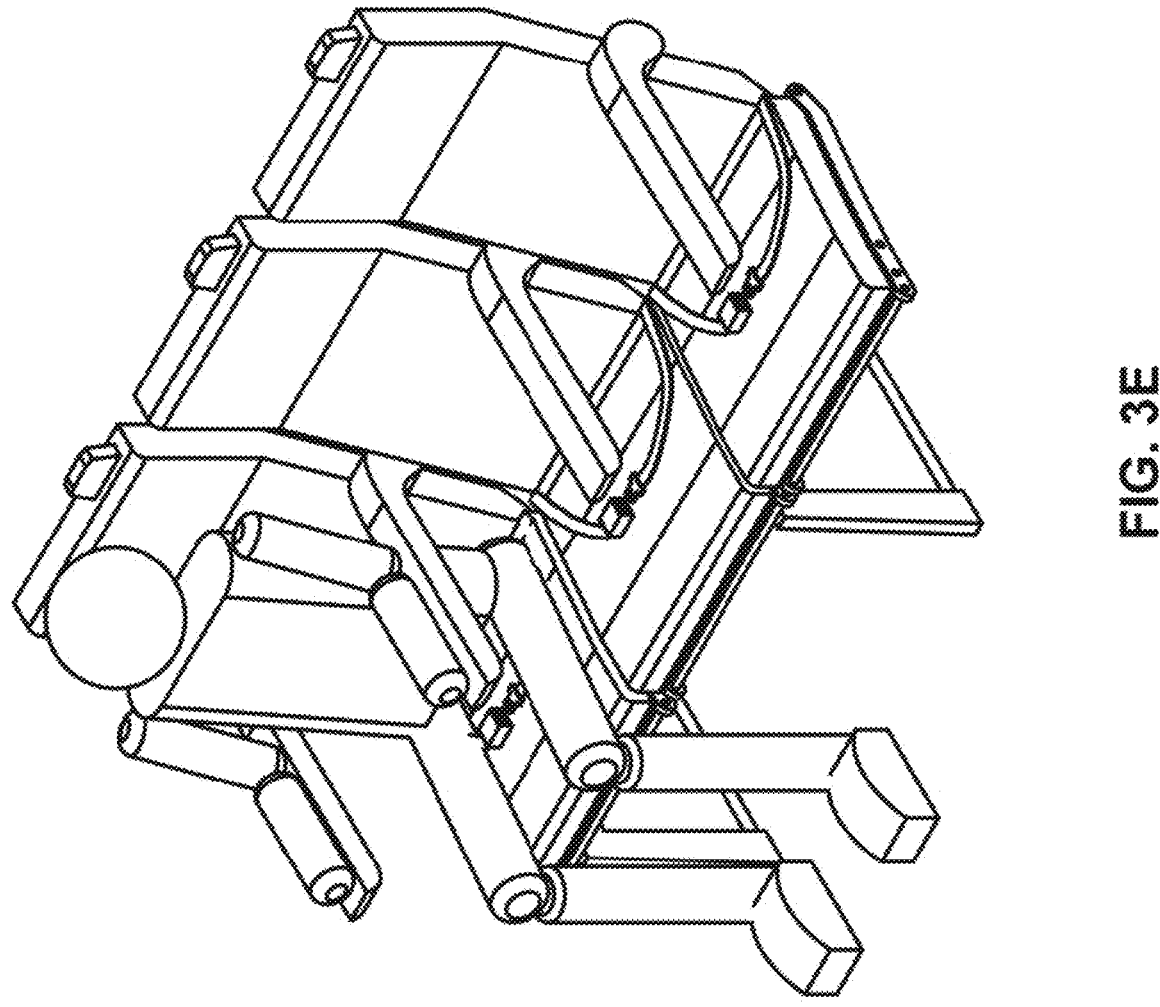
Figure 3F:
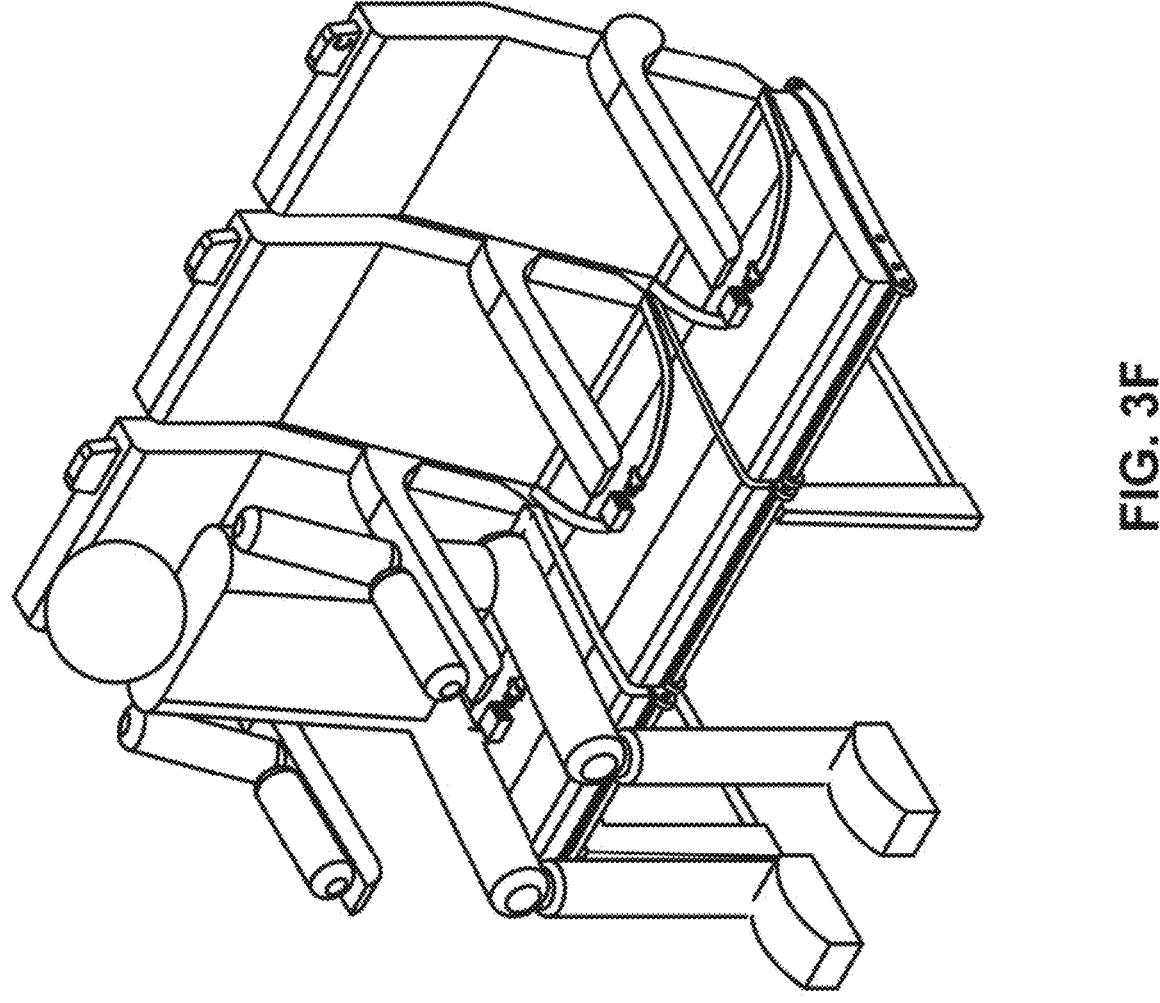

The method 200 may be further understood with reference to FIGS. 3A-3F. FIG. 3A depicts the seat group 100 with a first, second, and third of the passenger seats 102 each with the holographic displays 108 displaying the seat-identifier icons 114*a* of A, B, and C, respectively. FIG. 3B depicts the seat group 100 with the first and third passenger seats being occupied passenger seats and the second passenger seat being an unoccupied passenger seat, such that the occupancy sensors 110 of the first and third passenger seats generate the occupied signals 111a and the occupancy sensors 110 of the second passenger seat generates the unoccupied signals. FIG. 3C depicts the seat group 100 with the seat-identifier icons 114a of A and C from the first and third passenger seats, respectively, being stopped from display while the occupied signals 111a are received and the seat-identifier icons 114a of B of the second passenger seat continuing to be displayed. FIG. 3D depicts the seat group 100 with stopping the holographic display of the second passenger seat which is an unassigned passenger seat upon receiving the all-seated signal from displaying the seat-identifier icons 114a of B. The first and the third passenger seat may now be assigned as assigned passenger seats and the second passenger seat may be assigned as an unassigned passenger seat in the memory. FIG. 3E depicts the seat group 100 with the third passenger seat which is an assigned passenger seat as being unoccupied such that an unoccupied signals 111b are received. FIG. 3F depicts the seat group 100 with the holographic display of the third passenger seat displaying the seat-identifier icons 114a of C while the unoccupied signals 111b are received from the assigned passenger seat.

FIG. 4 depicts a flow diagram of a method 400, in accordance with one or more embodiments of the present disclosure. The method may also be referred to as a method of controlling the icons 114 of the holographic displays 108. The embodiments and the enabling technologies described previously herein in the context of the holographic displays 108 should be interpreted to extend to the method. It is further noted, however, that the method is not limited to the architecture of the holographic displays 108.

In a step 410, the seat-group controller 120 may cause the holographic displays 108 of the passenger seats 102 to display the fasten-seatbelt icons 114b in response to receiving the fasten-seatbelt signals 125. For example, the seat-group controller 120 may cause the holographic displays 108 of the passenger seats 102 to display the fasten-seatbelt icons 114b. The seat-group controller 120 may or may not cause the holographic displays 108 of the unoccupied passenger seats to display the fasten-seatbelt icons 114b.

In a step 420, the seat-group controller 120 may receive the seatbelt signals 117 from the seatbelt sensors 116 of the occupied passenger seats. The seatbelt signals 117 may include the fastened-seatbelt signals 117a and/or unfastened-seatbelt signals 117b.

In a step 430, the seat-group controller 120 may stop the holographic displays 108 of the occupied passenger seats from displaying the fasten-seatbelt icons 114b in response to receiving the fastened-seatbelt signals 117a of the seatbelt signals 117. The fasten-seatbelt icons 114b may provide a visual indicator to the flight attendants which of the passenger has and has not fastened the seatbelts 112. The flight attendants may identify the occupants who have not fastened the seatbelts 112, reducing the inspection time unlike checking each seat manually.

Figure 5A:
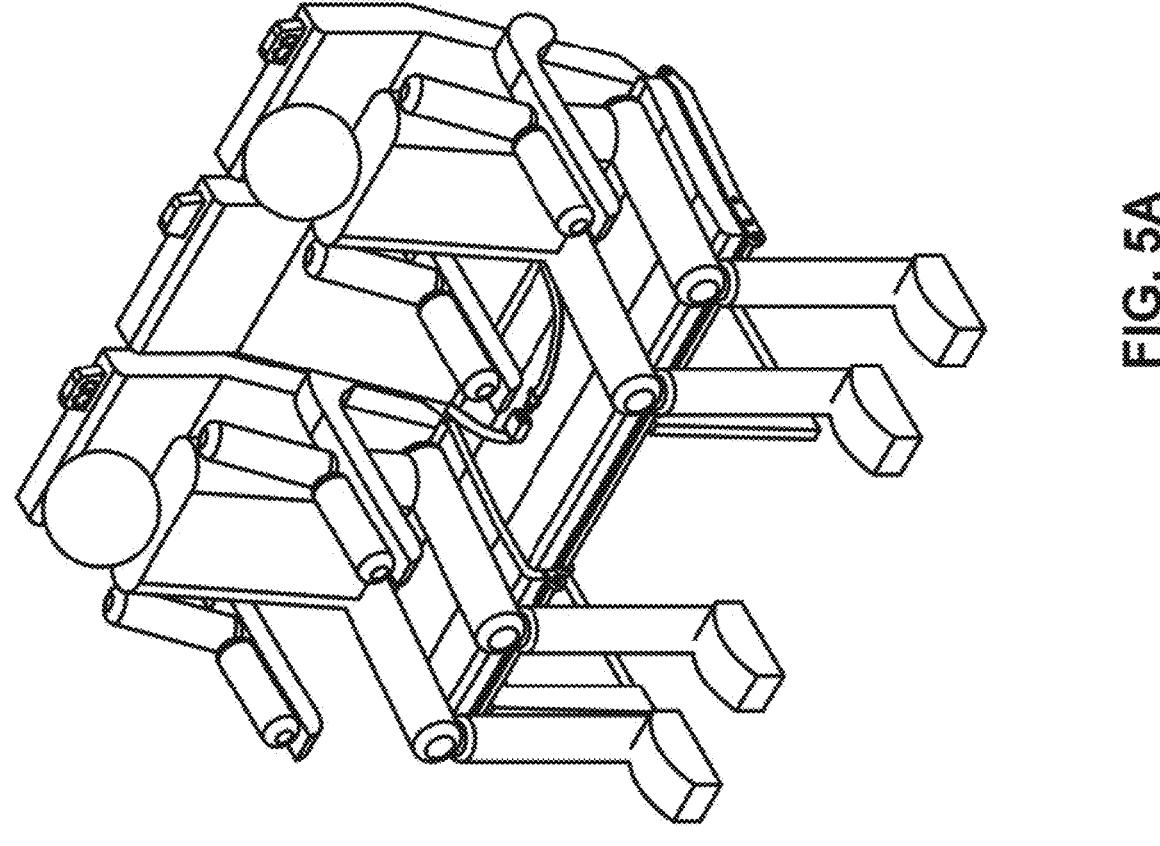
FIGS. 5A-5C depict one or more steps of the method, in accordance with one or more embodiments of the present disclosure.
Figure 5B:
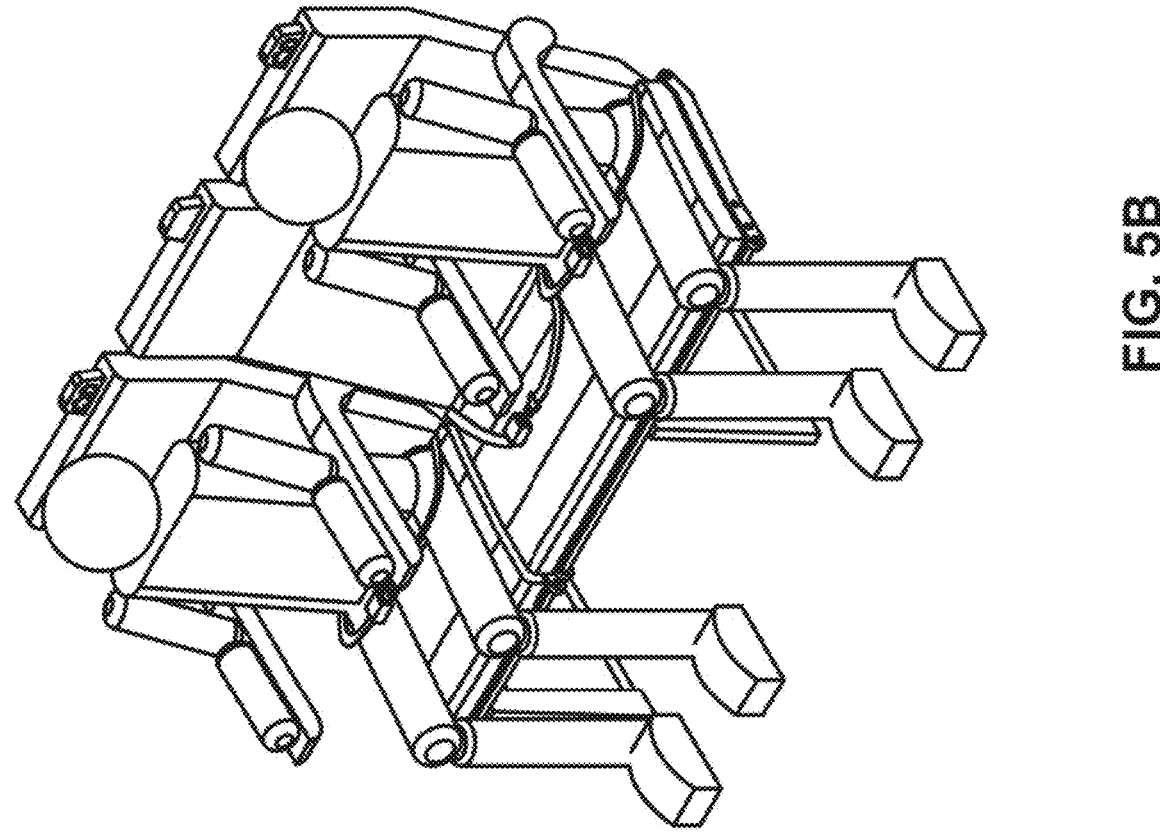
Figure 5C:
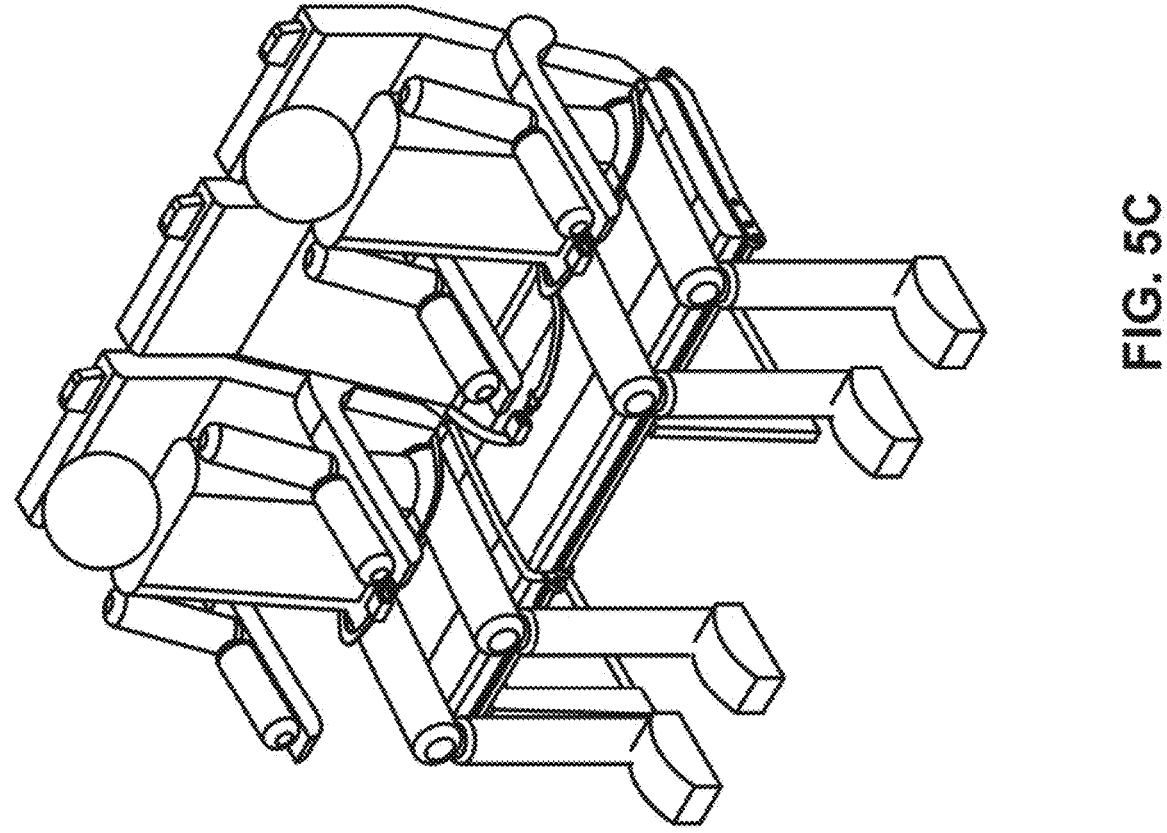

The method 400 may be further understood with reference to FIGS. 5A-5C. FIG. 5A depicts the seat group 100 with first and third of the passenger seats 102 which are occupied passenger seats, where the holographic displays 108 of the occupied passenger seats display the fasten-seatbelt icons 114b and where the holographic displays 108 of the unoccupied passenger seats do not display the fasten-seatbelt icons 114b. FIG. 5B depicts the seat group 100 with the first and third of the passenger seats 102 which are occupied passenger seats and with the seatbelts 112 being fastened.

FIG. 5C depicts the seat group 100 with first and third of the passenger seats 102 which are occupied passenger seats, where the holographic displays 108 of the occupied passenger seats stop displaying the fasten-seatbelt icons 114b in response to the seatbelts 112 being fastened.

Figure 6A:
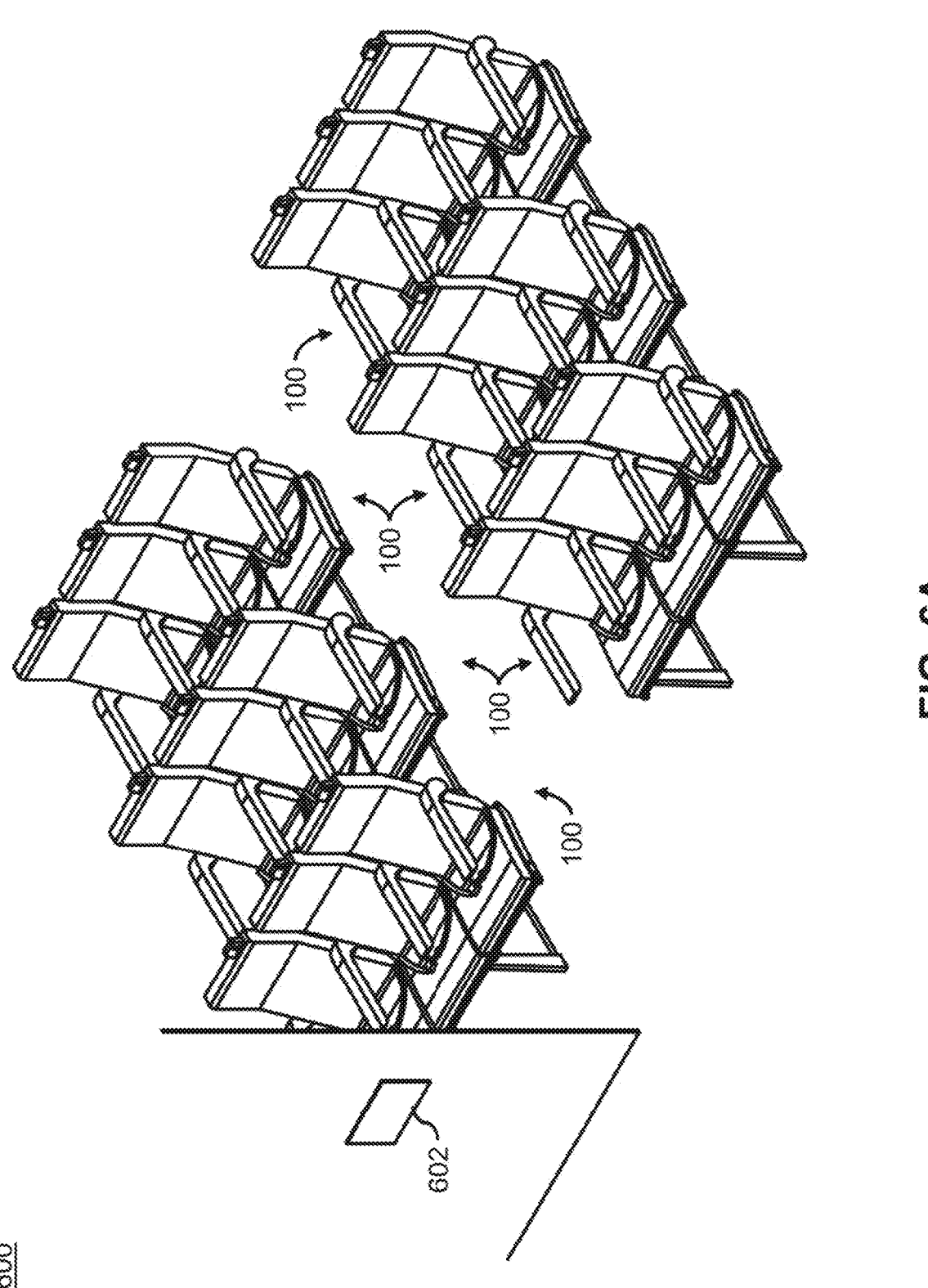
FIG. 6A depicts a perspective view of an aircraft including the seat groups, in accordance with one or more embodiments of the present disclosure.
Figure 6B:
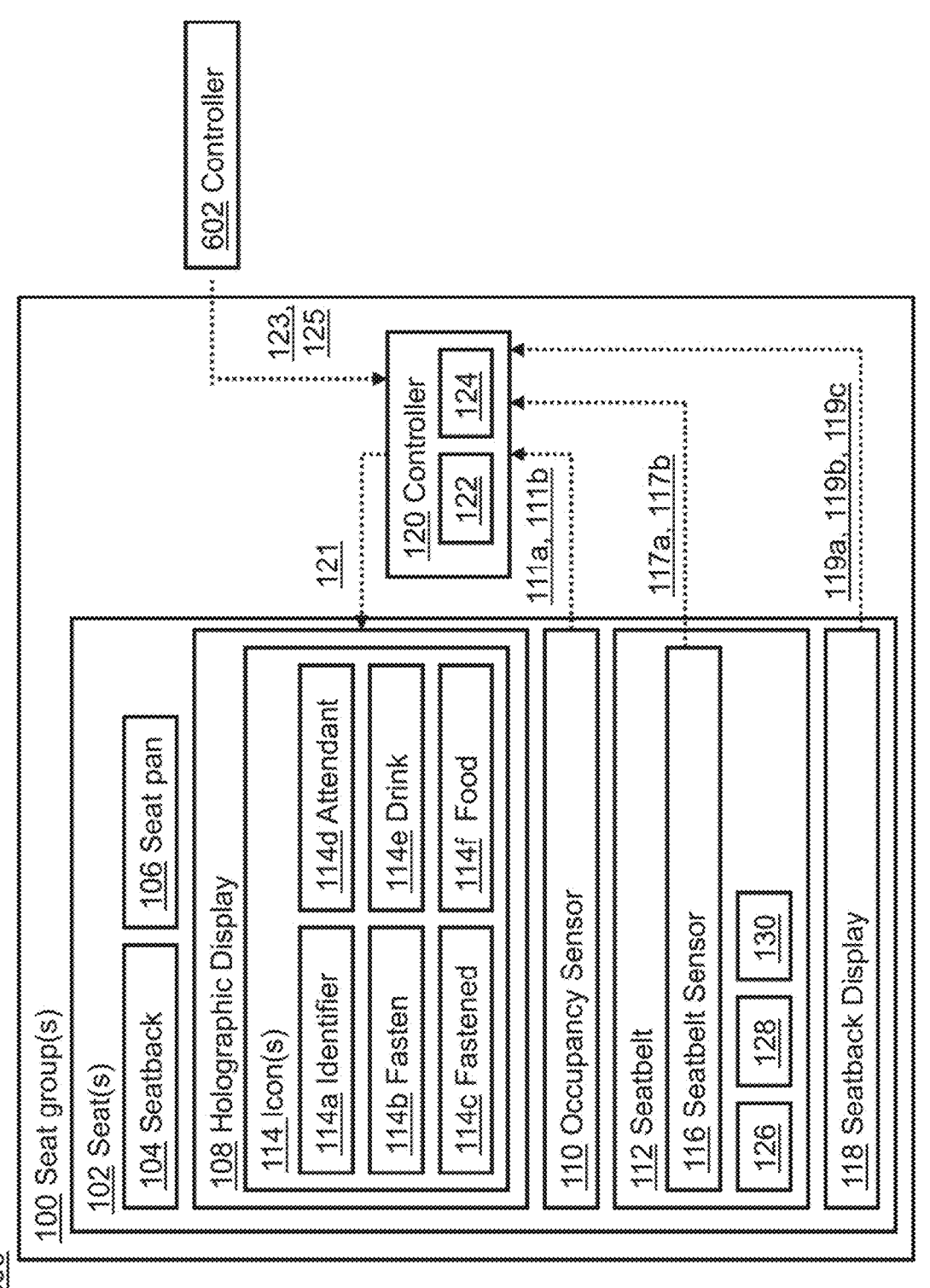
FIG. 6B depicts a simplified block diagram of the aircraft, in accordance with one or more embodiments of the present disclosure.

FIGS. 6A-6B depict an aircraft 600, in accordance with one or more embodiments of the present disclosure. The aircraft 600 may include one or more of the seat groups 100. The seat groups 100 mount to a floor (e.g., to a floor-mounted track) of the aircraft 600. The holographic displays 108 may be visible from an aisle of the aircraft 600. The aircraft 600 may also include a flight-attendant controller 602. The flight-attendant controller 602 may be disposed within a galley of the aircraft 600. The holographic displays 108 may be visible from the flight-attendant controller 602.

The flight-attendant controller 602 may be coupled to the seat-group controllers 120 of the seat groups 100. The seat-group controllers 120 may receive the all-seated signals 123 and/or the fasten-seatbelt signals 125 from the flight-attendant controller 602.

Referring generally again to FIGS.

A module can take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the modules can include any type of component for accomplishing or facilitating achievement of the operations described herein. For example, a circuit as described herein can include one or more transistors, logic gates (e.g., NAND, AND, NOR, OR, XOR, NOT, XNOR, etc.), resistors, multiplexers, registers, capacitors, inductors, diodes, wiring, and so on), and programmable hardware devices (e.g., field programmable gate arrays, programmable array logic, programmable logic devices or the like). The modules can include a processor and one or more memory devices for storing instructions that are executable by each of the processors.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be affected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period. For example, the memory may be random access memory (RAM), and the results may not necessarily persist indefinitely in the memory.

It is noted herein that the one or more components of system may be communicatively coupled to the various other components of system in any manner known in the art. For example, the one or more processors may be communicatively coupled to each other and other components via a wireline connection or wireless connection.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A seat group comprising:
a plurality of passenger seats comprising:
    a plurality of seatbacks;
    a plurality of seat pans;
    a plurality of holographic displays, wherein the plurality of holographic displays are disposed above the plurality of seatbacks, wherein the plurality of holographic displays are configured to display a plurality of icons, wherein the plurality of holographic displays are transparent, wherein the plurality of icons illuminate forwards and rearwards from the plurality of holographic displays; and
    a plurality of seat belts; and
a seat-group controller configured to cause the plurality of holographic displays to display the plurality of icons.

2. The seat group of claim 1, wherein the plurality of passenger seats are in a three-abreast configuration.

3. The seat group of claim 1, wherein the plurality of holographic displays are coupled to a top of the plurality of seatbacks.

4. The seat group of claim 1, wherein the plurality of holographic displays comprise a trapezoid shape.

5. The seat group of claim 1, wherein the plurality of icons comprise a plurality of seat-identifier icons, wherein the plurality of seat-identifier icons comprise seat numbers and seat letters, wherein the seat-group controller is configured to cause the plurality of holographic displays to display the plurality of seat-identifier icons.

6. The seat group of claim 5, wherein the plurality of passenger seats comprise a plurality of occupancy sensors, wherein the plurality of occupancy sensors are configured to generate a plurality of occupancy signals;
    wherein the seat-group controller is configured to receive the plurality of occupancy signals, wherein the plurality of occupancy signals comprise occupied signals of occupied passenger seats of the plurality of passenger seats and unoccupied signals of unoccupied passenger seats of the plurality of passenger seats;
    wherein the seat-group controller is configured to stop the plurality of holographic displays of the occupied passenger seats from displaying the plurality of seat-identifier icons in response to receiving the occupied signals.

7. The seat group of claim 6, wherein the seat-group controller is configured to assign the occupied passenger seats as assigned passenger seats and the unoccupied passenger seats as unassigned passenger seats;
    wherein the seat-group controller is configured to stop the plurality of holographic displays of the unassigned passenger seats from displaying the plurality of seat-identifier icons; and
    wherein the seat-group controller is configured to receive the unoccupied signals from the plurality of occupancy sensors of the assigned passenger seats;
    wherein the seat-group controller is configured to cause the plurality of holographic displays of the assigned passenger seats from which the unoccupied signals are received to display the plurality of seat-identifier icons while receiving the unoccupied signals.

8. The seat group of claim 1, wherein the plurality of icons comprise a plurality of fasten-seatbelt icons, wherein the seat-group controller is configured to cause the plurality of holographic displays to display the plurality of fasten-seatbelt icons in response to receiving a fasten-seatbelt signal.

9. The seat group of claim 8, wherein the plurality of passenger seats comprise occupied passenger seats, wherein the seat-group controller is configured to cause the plurality of holographic displays of the occupied passenger seats to display the plurality of fasten-seatbelt icons in response to receiving the fasten-seatbelt signal.

10. The seat group of claim 9, wherein the plurality of passenger seats comprise a plurality of seatbelt sensors, wherein the plurality of seatbelt sensors are configured to generate a plurality of seatbelt signals, wherein the plurality of seatbelt signals comprise a plurality of fastened-seatbelt signals and a plurality of unfastened-seatbelt signals, wherein the seat-group controller is configured to receive the plurality of seatbelt signals from the plurality of seatbelt sensors;
    wherein the seat-group controller is configured to stop the plurality of holographic displays of the occupied passenger seats from displaying the plurality of fasten-seatbelt icons in response to receiving the plurality of fastened-seatbelt signals.

11. The seat group of claim 1, wherein the plurality of passenger seats comprise a plurality of seatback displays, wherein the plurality of seatback displays are configured to generate a plurality of seatback display signals, wherein the seat-group controller is configured to receive the plurality of seatback display signals.

12. The seat group of claim 11, wherein at least one of:
    wherein the plurality of seatback display signals comprise a plurality of call-attendant signals, wherein the plurality of icons comprise a plurality of call-attendant icons; or
    wherein the plurality of seatback display signals comprise a plurality of drink-request signals, wherein the plurality of icons comprise a plurality of drink-request icons; or
    wherein the plurality of seatback display signals comprise a plurality of food-request signals, wherein the plurality of icons comprise a plurality of food-request icons.

13. An aircraft comprising:
a plurality of seat groups comprising:
    a plurality of passenger seats comprising:
        a plurality of seatbacks;
        a plurality of seat pans;
        a plurality of holographic displays, wherein the plurality of holographic displays are disposed above the plurality of seatbacks, wherein the plurality of holographic displays are configured to display a plurality of icons, wherein the plurality of holographic displays are transparent, wherein the plurality of icons illuminate forwards and rearwards from the plurality of holographic displays; and
        a plurality of seat belts; and
    a plurality of seat-group controllers configured to cause the plurality of holographic displays to display the plurality of icons.

14. The aircraft of claim 13, comprising a flight-attendant controller, wherein the plurality of seat-group controllers are configured to receive a plurality of all-seated signals and a plurality of fasten-seatbelt signals from the flight-attendant controller.

* * * * *